US009793981B2

(12) United States Patent
Lee et al.

(10) Patent No.: US 9,793,981 B2
(45) Date of Patent: Oct. 17, 2017

(54) MOBILE TERMINAL AND CONTROLLING METHOD THEREOF

(71) Applicant: LG ELECTRONICS INC., Seoul (KR)

(72) Inventors: Jungseok Lee, Seoul (KR); Jungwhan Kim, Seoul (KR); Seonghyok Kim, Seoul (KR); Jiyong Yoo, Seoul (KR); Gukchan Lim, Seoul (KR); Sunsang So, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 14/189,851

(22) Filed: Feb. 25, 2014

(65) Prior Publication Data
US 2014/0273849 A1 Sep. 18, 2014

(30) Foreign Application Priority Data

Mar. 15, 2013 (KR) ........................ 10-2013-0028080

(51) Int. Cl.
*H04B 7/26* (2006.01)
*G06F 3/01* (2006.01)
(Continued)

(52) U.S. Cl.
CPC ............... *H04B 7/26* (2013.01); *G06F 3/017* (2013.01); *G06F 3/0346* (2013.01); *H04M 1/7253* (2013.01); *G06F 1/1694* (2013.01); *G06F 1/3206* (2013.01); *G06F 2200/1614* (2013.01); *G06F 2200/1636* (2013.01);
(Continued)

(58) Field of Classification Search
CPC ... H04B 7/26; G06F 2200/1636; G06F 3/017; G06F 1/1681; G06F 3/0482; G06F 2200/1637; H04W 4/206; H04W 12/06; G09G 2370/16; H04M 1/7253; H04M 2250/64; H04M 1/67; H04L 67/38;
(Continued)

(56) References Cited

U.S. PATENT DOCUMENTS

2005/0198029 A1 9/2005 Pohja et al. ................. 707/8
2006/0256074 A1* 11/2006 Krum et al. .................. 345/156
(Continued)

OTHER PUBLICATIONS

Apple, iPhone_iOS4_User_Guide, 2011.*

*Primary Examiner* — Ping Hsieh
*Assistant Examiner* — James Yang
(74) *Attorney, Agent, or Firm* — Ked & Associates, LLP

(57) ABSTRACT

A mobile terminal and controlling method thereof are provided, which facilitates a terminal to be used in further consideration of user's convenience. Provided is a method of controlling an operation of a specific mobile terminal by forming a wireless communication group through a short range communication and then synthesizing analyses of motion patterns detected through mobile terminals belonging to the wireless communication group. Accordingly, in performing a function through a motion of each of a plurality of mobile terminals belonging to a single wireless communication group, a function is more accurately activated and accessibility to the function activation is improved, thereby enhancing user's convenience.

17 Claims, 19 Drawing Sheets

(51) Int. Cl.
  *H04M 1/725* (2006.01)
  *G06F 3/0346* (2013.01)
  G06F 1/16 (2006.01)
  G06F 1/32 (2006.01)
  H04B 1/3827 (2015.01)
  H04M 1/67 (2006.01)

(52) U.S. Cl.
  CPC ...... *G06F 2200/1637* (2013.01); *H04B 1/385* (2013.01); *H04B 1/3833* (2013.01); *H04M 1/67* (2013.01); *H04M 2250/12* (2013.01); *H04M 2250/22* (2013.01)

(58) Field of Classification Search
  CPC .. H04L 67/148; G06K 19/0723; G06K 19/06; G06K 9/00355
  See application file for complete search history.

(56) References Cited

U.S. PATENT DOCUMENTS

| | | | |
|---|---|---|---|
| 2006/0282021 A1* | 12/2006 | DeVaul | A61B 5/0024 600/595 |
| 2007/0182578 A1* | 8/2007 | Smith | 340/669 |
| 2009/0052785 A1 | 2/2009 | Shamaie | 382/209 |
| 2009/0153342 A1 | 6/2009 | Thorn | 340/669 |
| 2010/0123664 A1* | 5/2010 | Shin et al. | 345/169 |
| 2010/0167646 A1 | 7/2010 | Alameh et al. | 455/41.2 |
| 2011/0004436 A1* | 1/2011 | Beute | 702/141 |
| 2011/0106954 A1 | 5/2011 | Chatterjee et al. | 709/227 |
| 2011/0314153 A1* | 12/2011 | Bathiche et al. | 709/225 |
| 2012/0050153 A1* | 3/2012 | Dvortsov et al. | 345/156 |
| 2012/0306745 A1* | 12/2012 | Moore et al. | 345/158 |
| 2013/0057496 A1* | 3/2013 | Hong et al. | 345/173 |

\* cited by examiner

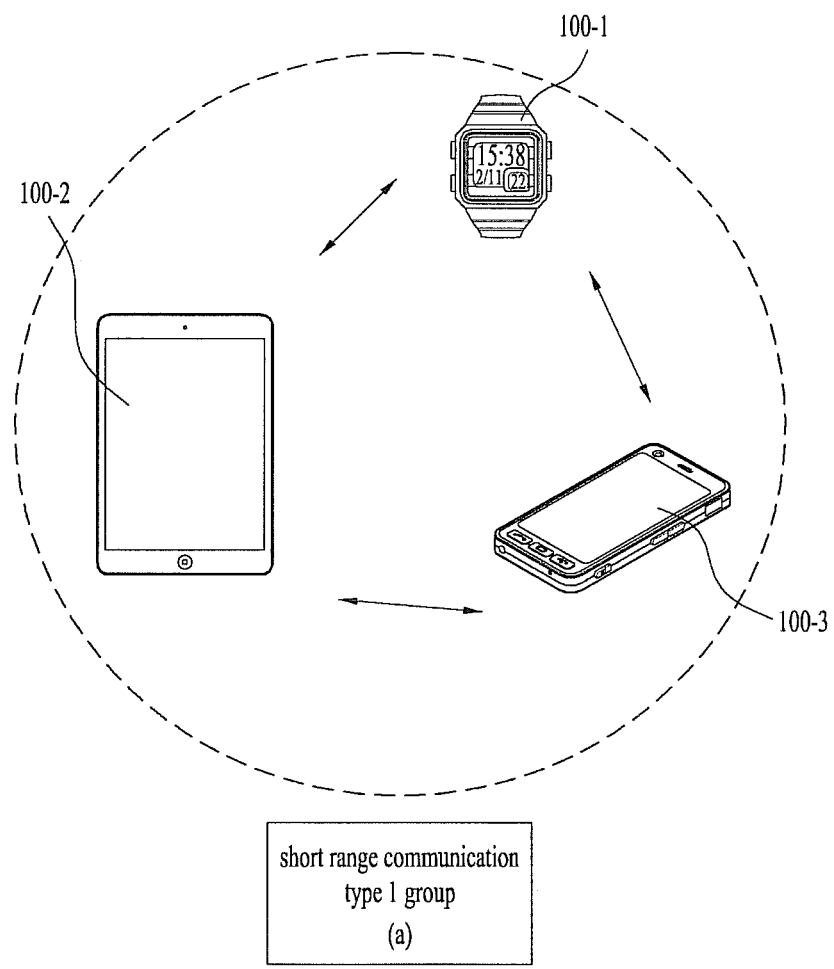

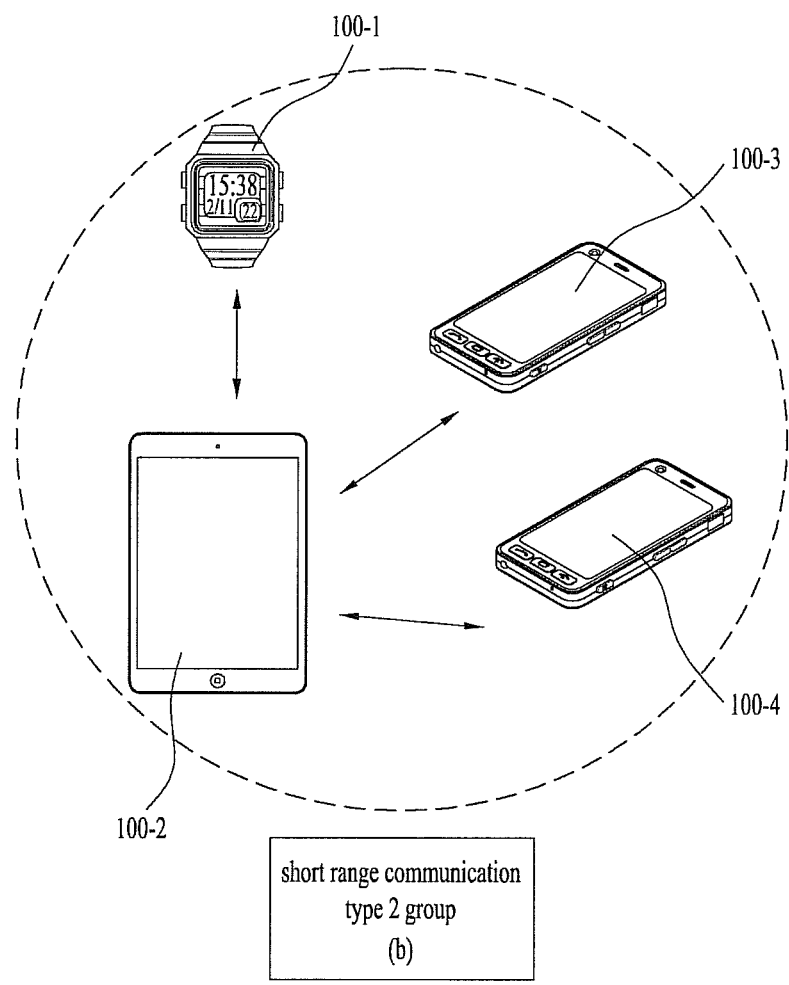

(a)
Knock on a 2$^{nd}$ terminal while wearing a 1$^{st}$ terminal (b)
Connect a short range communication after a 1$^{st}$ terminal has broadcasted a connection request

FIG. 15

| Wearable Device | Tablet PC | Operation mode switching of mobile terminal | Activation function in switched mode |
|---|---|---|---|
| ○ | ○ | • Sleep care mode | • Provide optimal alarm time and schedule based resting time by sleep pattern analysis |
| ○ | ◐ | • Secure mode | • Secure alarm function |
| ◐ | ○ | • Indoor mode | • Changing a main menu or a contact list, Setting a vibration mode, Connecting WiFi, Connecting a wired phone call, Turning off a GPS power |
| ● | ○ | • Activity mode | • Calorie calculation, Music recommendation |
| ◐ | ◐ | • Usual mode | • Location based service activation |
| ● | ● | • Outdoor mode | • Activation of app for a moving distance measurement |

○    Almost no motion <1st level>

◐    Partial motion detected <2nd level>

●    Severe motion <3rd level>

FIG. 16

| Wearable Device | Tablet PC | Operation mode switching of mobile terminal | Activation function in switched mode |
|---|---|---|---|
| ◐ <br> + Altitude, GPS activation | ◐ | • Location based service mode | ✓ If a motion of a mobile terminal is active over a prescribed duration, enter a location based service mode by activating GPS |
| ○ | ○ | • Indoor mode | ✓ Recognize a presence at home based on a location |
| ○ <br> ◐ <br> ○ | ○ <br> ○ <br> ○ | • Sleep pattern analysis mode | ✓ Record a sleep motion and pattern in a sleep <br> ✓ Sleep quality evaluation = f(motion quantity) <br> ✓ Current pleasant sleep quantity = f( past sleep quality ) |
| ◐ | ○ | • Alarm auto activation mode | ✓ If (alarm time = true), then activation(Vibrator) |
| ● | ○ | Tablet temporary deactivation mode | ✓ Output an event occurrence to a wearable device |
| + Tapping | | Tablet search mode | ✓ Output an indication to Tablet PC |
| ● | ◐ | Tablet activation mode | ✓ Output indication of an event occurrence through Tablet PC |
| ● | | Home appliance control mode | ✓ Recognize a wearable device by another device & attempt a connection <br> ✓ Display that another device is connected |
| ◐ | | Motion recognition mode | ✓ Control channel and volume through motion |

○ Almost no motion <1st level>

◐ Partial motion detected <2nd level>

● Severe motion <3rd level>

FIG. 17

| Wearable Device | Mobile phone | Operation mode switching of mobile terminal | Activation function in switched mode |
|---|---|---|---|
| ◐ + Altitude, GPS activation | ◐ | Location based service mode | ✓ If a motion of a phone is active over a prescribed duration, enter a location based service mode by activating GPS |
| ◐ | ○ | Car Control mode | ✓ If a hand is lifted at a right spot, check a vehicle location<br>✓ If stopping after motion of a phone, switch to a handsfree mode<br>✓ If activation of a phone is detected, end a mode and memorize a vehicle parked location |
| ◐ | ◐ | | |
| ◐ | ○ | | |
| ◐ + Altitued, GPS activation | ◐ | Location based service mode | ✓ If a motion of a phone is active over a prescribed duration, enter a location based service mode by activating GPS |
| ○ | ○ | Office mode | ✓ If no motion for a long term, guide a stretching<br>✓ Alarm for phone loss prevention<br>✓ In association with a scheduler, if there is no motion on a determined time, sound an alarm |
| ◐ + BT disconnect | ○ | | |
| ◐ | ◐ | | |

○ Almost no motion <1st level>
◐ Partial motion detected <2nd level>
● Severe motion <3rd level>

MOBILE TERMINAL AND CONTROLLING METHOD THEREOF

CROSS-REFERENCE TO RELATED APPLICATION(S)

Pursuant to 35 U.S.C. §119(a), this application claims the benefit of earlier filing date and right of priority to Korean Application No. 10-2013-0028080, filed on Mar. 15, 2013, the contents of which are hereby incorporated by reference herein in their entirety.

BACKGROUND

1. Field

The present disclosure relates to a mobile terminal, and more particularly, to a mobile terminal and controlling method thereof. Although the present disclosure is suitable for a wide scope of applications, it is particularly suitable for facilitating a terminal to be used in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as types of sensors provided to the mobile terminal are diversified, an intuitive motion of a user tends to be detected and a specific function corresponding to the detected motion tends to be activated. However, since it is difficult to obtain a user's activation intention through a sensor in a simple manner, the demand for a method of determining an intuitive motion of a user more accurately is rising.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 3A and 3B are diagrams of types of a short range communication connection between mobile terminals according to one embodiment of the present disclosure;

FIG. 15 is a diagram for a 1st example of a process for detecting motion levels of a wearable device and a tablet PC and then switching an operating mode of a mobile terminal in response to the detected motion levels according to one embodiment of the present disclosure;

FIG. 16 is a diagram for a 2nd example of a process for detecting motion levels of a wearable device and a tablet PC and then switching an operating mode of a mobile terminal in response to the detected motion levels according to one embodiment of the present disclosure; and FIG. 17 is a diagram for a 3rd example of a process for detecting motion levels of a wearable device and a tablet PC and then switching an operating mode of a mobile terminal in response to the detected motion levels according to one embodiment of the present disclosure.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

Embodiments of the present invention are directed to a mobile terminal and controlling method thereof that substantially obviate one or more problems due to limitations and disadvantages of the related art.

One object of the present invention is to provide a mobile terminal and controlling method thereof, by which a user's motion can be analyzed more accurately and quickly.

Another object of the present invention is to provide a mobile terminal and controlling method thereof, by which a specific function corresponding to the analyzed motion can be activated.

Additional advantages, objects, and features of the invention will be set forth in the disclosure herein as well as the accompanying drawings. Such aspects may also be appreciated by those skilled in the art based on the disclosure herein.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present disclosure can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
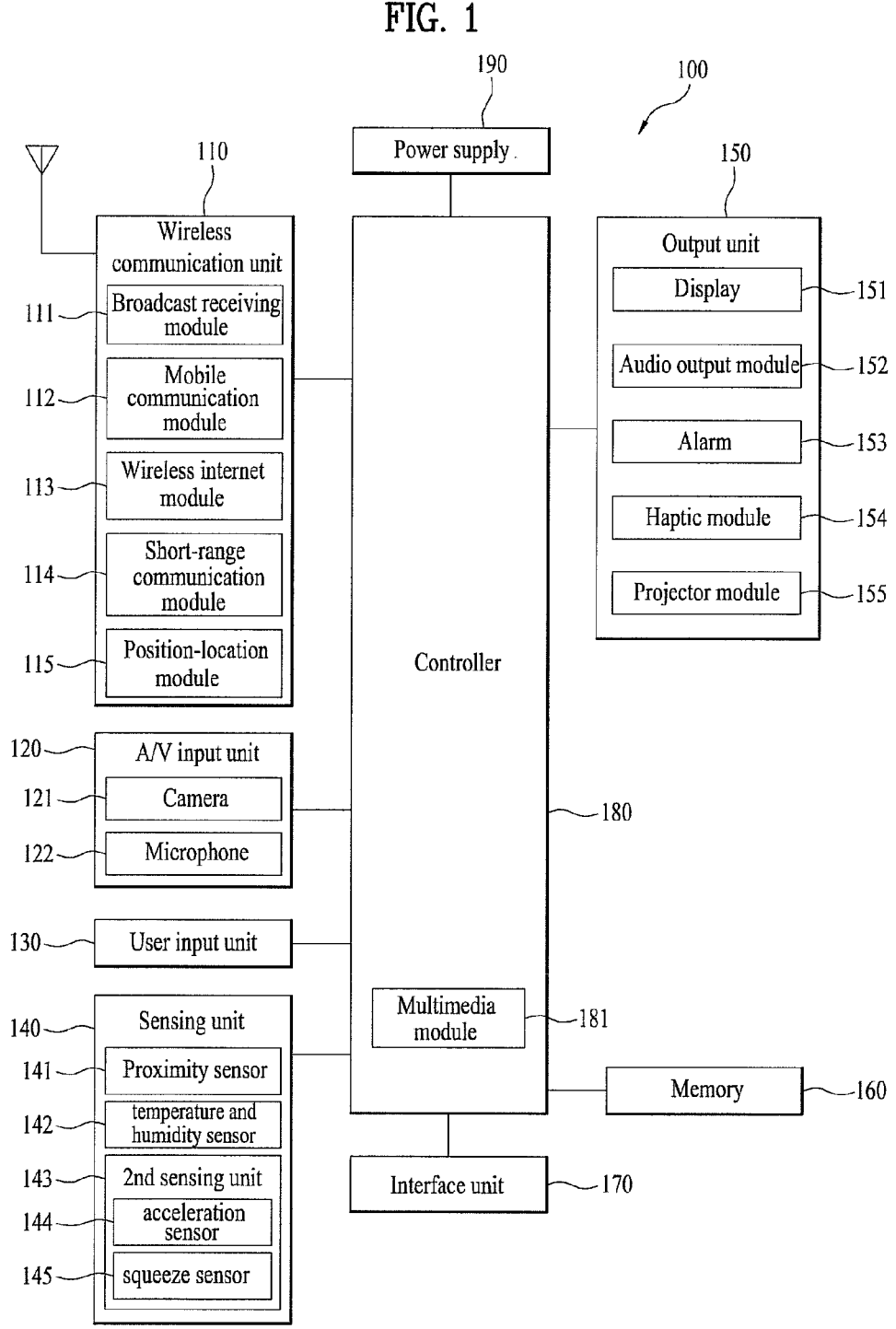
FIG. 1 is a block diagram of a mobile terminal according to one embodiment of the present disclosure.

FIG. 1 is a block diagram of a mobile terminal 100 in accordance with an embodiment of the present disclosure. FIG. 1 shows the mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
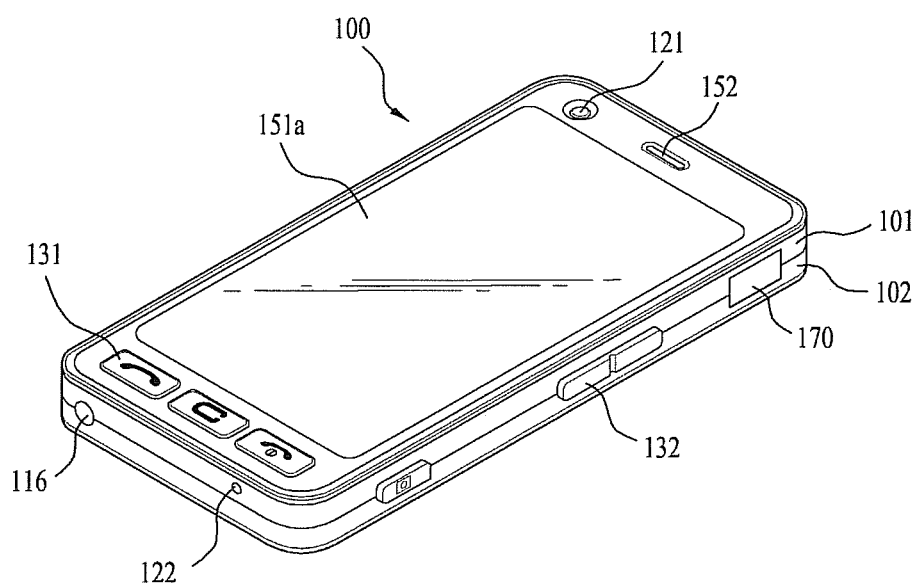
FIG. 2A is a front perspective diagram of a mobile terminal according to one embodiment of the present disclosure.

FIG. 2A is a front perspective diagram of a mobile terminal according to one embodiment of the present disclosure.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
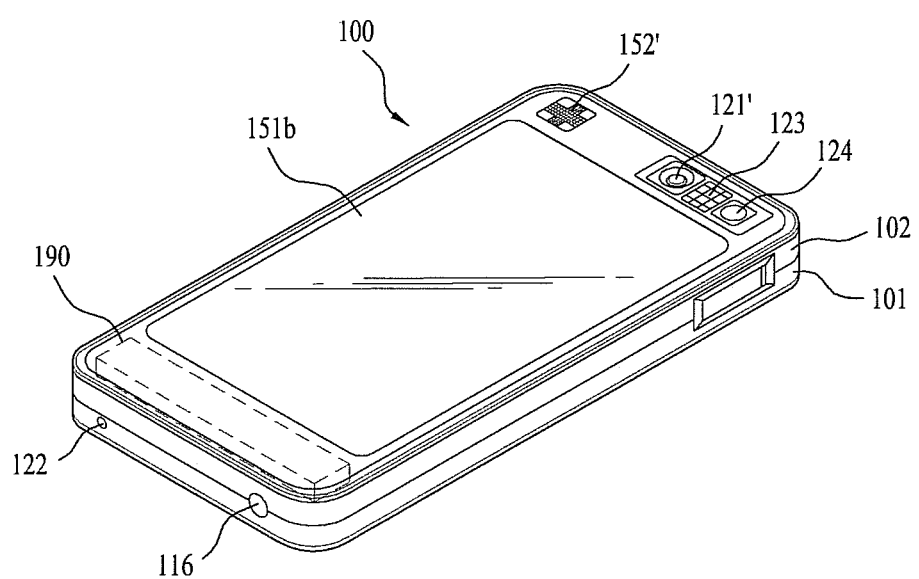
FIG. 2B is a rear perspective diagram of a mobile terminal according to one embodiment of the present disclosure.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

<Wearable Device>

A wearable device may be provided to communicate with other terminals described herein and capable of performing the same functions of the other terminals. Yet, since the wearable device differs from other terminals in being wearable on a user's body, an external appearance and operating method of the wearable device may vary more or less. A mobile terminal wearable on a wrist may be a representative example of the wearable device. In order to be put on the wrist, the mobile terminal may have a shape similar to that of a wrist watch. And, a size or capacity of the mobile terminal may be smaller than a generally required for a general mobile terminal.

As the portability of a mobile terminal tends to be emphasized recently, the significance of the above-mentioned wearable device increasingly rises. Compared to a general mobile terminal, the wearable device may have restrictions put on its functions despite the advantage in portability. Moreover, user's convenience in using the wearable device may be degraded. For example, a size of a display and/or a size of a user input means may decrease.

Therefore, one embodiment of the present disclosure proposes methods of minimizing the restricted functions and the degradation of convenience in utilizing the wearable device advantageous in aspect of portability.

In describing embodiments of the present disclosure, a device wearable on a wrist may be taken as a representative example of a wearable device, by which the present disclosure may be non-limited. And, it is apparent to those skilled in the art that the present disclosure is applicable to other body parts of a user and/or a general mobile terminal.

In the following description, embodiments related to a controlling method implemented in the above-configured mobile terminal are explained in detail with reference to the accompanying drawings.

FIGS. 3A and 3B are diagrams of types of a short range communication connection between mobile terminals according to one embodiment of the present disclosure.

FIG. 3A shows a type 1 group that establishes mutually independent connections among $1^{st}$ to $3^{rd}$ mobile terminals 100-1 to 100-3. Since the independent connections are established among the mobile terminals in the type 1 group, even if a prescribed one of the mobile terminals is disconnected from the type 1 group, it may not affect the connection between the rest of the mobile terminals remaining in the type 1 group. And, the prescribed mobile terminal can transceive data with each of the rest of the mobile terminals belonging to the type 1 group.

FIG. 3B shows a type 2 group that establishes short range communications by setting a prescribed mobile terminal 100-2 as a communication host. In doing so, since the connections are established centering on the communication host mobile terminal 100-2, some restrictions may be put on the data transceiving among the rest of the mobile terminals. If the communication host mobile terminal 100-2 is disconnected from the corresponding group, the short range communication connections among the rest of the mobile terminals used to be connected to the communication host mobile terminal 100-2 may be disabled.

In the following description, the type 2 group is taken as an example, by which the present disclosure may be non-limited. And, it is apparent that the following description is applicable to such a short range communication group as the type 1 group.

In the example mentioned in the following description, motion patterns respectively detected by a plurality of mobile terminals currently participating in the short range communications and signal data respectively received by a plurality of the mobile terminals can be exchanged with each other. And, a controller of a prescribed one of the mobile terminals can perform a prescribed function based on the exchanged motion patterns or the exchanged received signals.

<Method of Establishing a Connection for a Short Range Communication Between Terminals>

Figure 4:
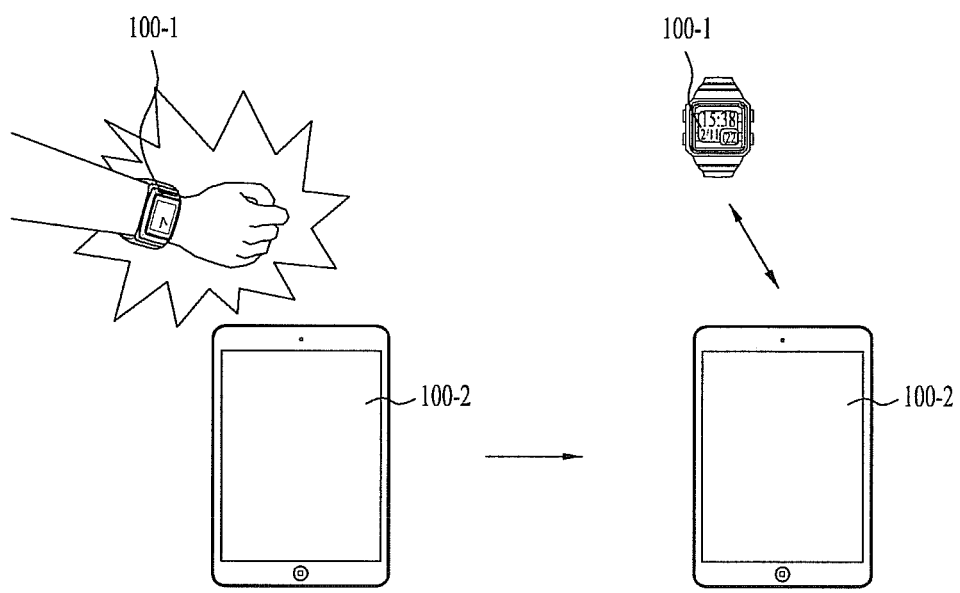
FIG. 4 is a diagram for a method of establishing a connection for a short range communication according to one embodiment of the present disclosure.

FIG. 4 is a diagram for a method of establishing a connection for a short range communication according to one embodiment of the present disclosure.

Referring to FIG. 4, a connection is established between a $1^{st}$ mobile terminal 100-1 and a $2^{nd}$ mobile terminal 100-2. In this case, the $1^{st}$ mobile terminal 100-1 includes the aforementioned wearable device for example. As mentioned in the foregoing description, a wrist wearable device is taken as an example in the description with reference to FIG. 4, by which one embodiment of the present disclosure may be non-limited. And, it is apparent that one embodiment of the present disclosure is applicable to mobile terminals of other types.

A method of establishing a short range communication according to one embodiment of the present disclosure proposes a method including a step of detecting a motion pattern through each terminal intending to establish a short range connection and a step of if the detected motion pattern is identical, establishing a connection for a short range communication.

Referring to FIG. 4, a 1$^{st}$ wearable device 100-1 is fixed as a wearable device to a wrist of a user. In doing so, if the user performs an action of knocking (or tapping) on a 2$^{nd}$ mobile terminal 100-2 (e.g., an action of knocking at least twice, etc.), each of the 1$^{st}$ mobile terminal 100-1 and the 2$^{nd}$ mobile terminal 100-2 can detect the same motion pattern.

In the mobile terminal 100 according to one embodiment of the present disclosure, the sensing unit 140 may include an acceleration sensor, a gyro sensor and/or a geomagnetic sensor. Through inputs detected by these sensors, it is able to detect a motion of the mobile terminal 100. And, the detected motion patterns mentioned in the description of embodiments of the present disclosure may mean all motion patterns detectable irrespective of types of sensors.

If the detected motion pattern matches a prescribed motion pattern, the 1$^{st}$ mobile terminal 100-1 and the 2$^{nd}$ mobile terminal 100-2 attempt a connection for a short range communication. For instance, one of the mobile terminals makes a request for a short range communication connection to the other. In the step of attempting the connection (or before attempting the connection), the 1$^{st}$ mobile terminal 100-1 and the 2$^{nd}$ mobile terminal 100-2 can exchange the detected motion patterns with each other. In doing so, the prescribed motion pattern may include a predefined motion pattern. Such an exchanging step may be performed in a manner of broadcasting information on the detected motion pattern. In this case, the information on the motion pattern may further include a timing information of a motion pattern in order to check whether a time of the motion pattern is matched, which will be described later.

Generally, in a process for establishing a communication between terminals, a procedure for the terminals to authenticate each other may be necessary. In Bluetooth communication, for example, a process for establishing a connection between two terminals includes the step of checking an authentication code by a user in order for the terminals to authenticate each other.

According to one embodiment of the present disclosure, it is proposed that a generally required authentication procedure is performed through a confirmation of a motion pattern detected through each device. In particular, the authentication procedure is performed in a manner of exchanging the motion pattern detected trough the 1$^{st}$ mobile terminal 100-1 and the motion pattern detected through the 2$^{nd}$ mobile terminal 10-2 with each other and then determining whether the exchanged motion patterns match each other. In more particular, the controller 180 of each of the terminals 100-1 and 100-2 can determine whether the motion patterns match each other by further considering whether the detected times of the motion patterns match each other (e.g., a case that two terminals for authentication are synchronized with each other in time).

If determining that the exchanged motion patterns match each other, the controller 180 of each of the 1$^{st}$ mobile terminal 100-1 and the 2$^{nd}$ mobile terminal 100-2 completes the authentication step and is then able to establish a connection.

On the other hand, in case of this connection, without exchanging the detected motion patterns, as mentioned in the forgoing description, the aforementioned authentication procedure may be performed in a manner of transmitting a detected motion pattern to a host terminal from a client terminal or transmitting a detected motion pattern to a client terminal from a host terminal.

Moreover, in the authentication step, the 1$^{st}$ mobile terminal 100-1 and the 2$^{nd}$ mobile terminal 100-2 can consider the strength of RSSI (received signal strength indicator) together. According to one embodiment of the present disclosure, the reason for considering the strength of the RSSI (received signal strength indicator) is that it is proposed to further consider a distance between devices to be connected to each other by short range communication. In particular, referring to FIG. 4, if the 2$^{nd}$ mobile terminal 100-2 is knocked while the 1$^{st}$ mobile terminal 100-1 is worn on a wrist, the 1$^{st}$ mobile terminal 100-1 and the 2$^{nd}$ mobile terminal 100-2 may be located close to each other. Assuming that the 2$^{nd}$ mobile terminal 100-2 is a host of the connection, the 2$^{nd}$ mobile terminal 100-2 measures RSSI of a signal received from the 1$^{st}$ mobile terminal 100-1. Only if a value of the measured RSSI is equal to or greater than a prescribed value, the 2$^{nd}$ mobile terminal 100-2 can perform an authentication procedure.

According to one embodiment of the present disclosure described with reference to FIG. 4, the mobile terminal 100 can stay in a state (e.g., an operating state) in which such a sensor of detecting a motion of the mobile terminal 100 as an acceleration sensor and the like is turned on all the time. Yet, in case that the sensor is turned on all the time, the power consumption of the corresponding sensor naturally causes a problem. Moreover, a power consumption in analyzing signals applied through the corresponding sensor may cause another problem. Therefore, according to another embodiment of the present disclosure, a mobile terminal maintains a basic operation setting of an acceleration sensor not as an operating state but as a non-operating state. If the mobile terminal detects another mobile terminal nearby in the non-operating state, the mobile terminal can switch the non-operating state of the acceleration sensor to the operating state. According to a further embodiment of the present disclosure, the controller 180 of the mobile terminal maintains the acceleration sensor to stay in the operating state all the time but does not keep analyzing signals applied by the acceleration sensor. If another mobile terminal is detected nearby, the controller 180 is proposed to perform the analysis. If so, the mobile terminal can minimize the waste of the power consumption in analyzing the signals applied from the acceleration sensor. According to the present embodiment, like the former embodiment, if another mobile terminal is detected nearby, it is able to analyze signals applied through the sensor after the detection.

<Operation 1 after Short Range Communication Connection—Auto Unlock>

According to one embodiment of the present disclosure, it is proposed to perform a prescribed operation based on a signal sensed through each of a plurality of mobile terminals having short range communications established in-between. As mentioned in the foregoing description, the reason why such a method is proposed in embodiments of the present disclosure is that a limited function in one mobile terminal can be efficiently provided through another mobile terminal. In particular, in case of a wearable device, since the limited function and capacity of the wearable device may cause inconvenience, functions can be extended to another mobile terminal not having such limitations using the short range communication. According to one embodiment of the present disclosure, the following is further proposed. First of all, if it is detected that distances among a plurality of mobile terminals having the short range communications established in-between decrease, an accurate user's motion input is analyzed by raising a level of the motion detection. Although various methods can be taken into consideration in raising the level of the motion detection, an additional sensor, an additional motion analysis function and the like can be considered according to one embodiment of the present disclosure.

Figure 5:
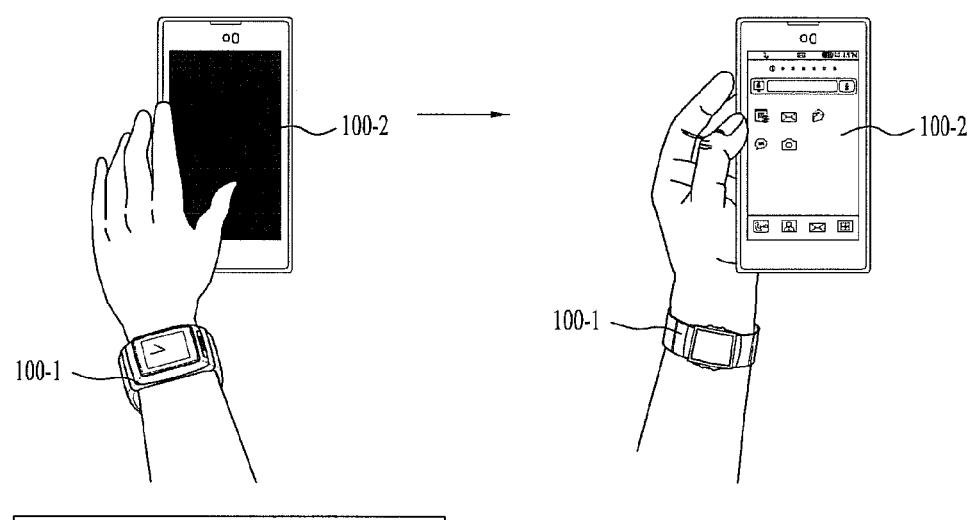
FIG. 5 is a diagram for one example of activating a prescribed function of a prescribed mobile terminal through motions sensed by mobile terminals having a short range communication connection established in-between according to one embodiment of the present disclosure.

FIG. 5 is a diagram for one example of activating a prescribed function of a prescribed mobile terminal through motions sensed by mobile terminals having a short range communication connection established in-between according to one embodiment of the present disclosure.

FIG. 5 (a) shows a situation in which a user attempts to grab a $2^{nd}$ mobile terminal 100-2 placed on a floor while wearing a $1^{st}$ mobile terminal 100-1 on a wrist. In this situation, the present disclosure intends to propose that a locked state of the $2^{nd}$ mobile terminal 100-2 is released based on a signal sensed each of the $1^{st}$ mobile terminal 100-1 and the $2^{nd}$ mobile terminal 100-2.

In particular, if the user grabs the $2^{nd}$ mobile terminal 100-2 while wearing the $1^{st}$ mobile terminal 100-1, it is able to predict that the following signals can be sensed through the $1^{st}$ mobile terminal 100-1 and the $2^{nd}$ mobile terminal 100-2.

Regarding a $1^{st}$ predicted sensing signal, a strength (RSSI) of a signal received by the $2^{nd}$ mobile terminal 100-2 from the $1^{st}$ mobile terminal 100-1 and/or a strength of a signal received by the $1^{st}$ mobile terminal 100-1 from the $2^{nd}$ mobile terminal 100-2 may be equal to or greater than a prescribed numerical value. If a user grabs the $2^{nd}$ mobile terminal 100-2 while wearing the $1^{st}$ mobile terminal 100-1, a physical distance between the mobile terminals eventually decreases. In particular, in case that the $1^{st}$ mobile terminal 100-1 (i.e., a wearable device) is a wrist watch type, an RF antenna of the $1^{st}$ mobile terminal 100-1 may be designed to be situated on a wrist band. If so, an antenna location of the $1^{st}$ mobile terminal 100-1 and an antenna location of the $2^{nd}$ mobile terminal 10-2 can get closer to each other. As mentioned in the foregoing description of the direction proposed through one embodiment of the present disclosure, in order to determine whether the $1^{st}$ mobile terminal 100-1 and the $2^{nd}$ mobile terminal 100-2 are close in distance to each other, it is able to utilize RSSI. In particular, if it is determined that the RSSI is equal to or greater than a prescribed numerical value, it is able to determine that the $1^{st}$ mobile terminal 100-1 and the $2^{nd}$ mobile terminal 100-2 are close to each other. Therefore, according to one embodiment of the present disclosure, if it is determined that the $1^{st}$ mobile terminal 100-1 and the $2^{nd}$ mobile terminal 100-2 are close to each other, it is proposed that an additional sensor is activated in order to enhance a level of detecting a motion. For instance, if the RSSI is equal to or greater than a prescribed numerical value, it is able to analyze a motion of each of the $1^{st}$ mobile terminal 100-1 and the $2^{nd}$ mobile terminal 100-2 in a manner of activating an acceleration sensor and/or a gyro sensor, by which sensor types are non-limited, and then analyzing signals detected by the activated acceleration sensor.

In the following description, a predicted sensing signal may include a detected signal predicted depending on a detection level.

Regarding a $2^{nd}$ predicted sensing signal, it may be a signal indicating that a motion pattern of the $2^{nd}$ mobile terminal 100-2 changes rapidly. As the $1^{st}$ mobile terminal 100-1 and the $2^{nd}$ mobile terminal 100-2 get close to each other, at least one sensor for analyzing a motion of each mobile terminal can be activated. In case of the $2^{nd}$ mobile terminal 100-2, since the $2^{nd}$ mobile terminal 100-2 is placed on a floor while its screen is locked, a signal sensed through the activated at least one sensor may indicate that a motion of the $2^{nd}$ mobile terminal 100-2 is expected to be very small. Yet, a signal sensed through the sensing unit 140 may change rapidly as soon as the $2^{nd}$ mobile terminal 100-2 is grabbed by a user. In this case, a sensor for sensing the $2^{nd}$ signal may include an acceleration sensor and/or a proximity sensor.

Regarding a $3^{rd}$ predicted sensing signal, an angle of the $1^{st}$ mobile terminal 100-1 detected from the $1^{st}$ mobile terminal 100-1 by at least one activated sensor may rotate over a prescribed numerical value. Referring to FIG. 5, before a user grabs the $2^{nd}$ mobile terminal 100-2, a display face of the $1^{st}$ mobile terminal 100-1 faces in top direction [FIG. 5 (a)]. Yet, after the user has grabbed the $2^{nd}$ mobile terminal 100-2, the display face of the $1^{st}$ mobile terminal 100-1 faces in bottom direction [FIG. 5 (b)]. In particular, comparing the display face of the $1^{st}$ mobile terminal 100-1 before grabbing the $2^{nd}$ mobile terminal 100-2 to the display face of the $1^{st}$ mobile terminal 100-1 after grabbing the $2^{nd}$ mobile terminal 100-2, it can be observed that the $1^{st}$ mobile terminal 100-1 has rotated itself. The reason for this is that, when a wearer wears the $1^{st}$ mobile terminal 100-1 as a wearable device on a wrist, the back of the hand of the wearer and the display face of the $1^{st}$ mobile terminal 100-1 can correspondingly move in the same direction.

As mentioned in the foregoing description, if a user wearing the $1^{st}$ mobile terminal 100-1 grabs the $2^{nd}$ mobile terminal 100-2 connected by the short range communication, it is able to predict a signal that can be detected through each of the mobile terminals 100-1 and 100-2. Therefore, according to one embodiment of the present disclosure, the $2^{nd}$ mobile terminal 100-2 is proposed to release a set screen lock by combining the at least one or more predicted signals. In the process for combining the signals, the $1^{st}$ mobile terminal 100-1 and the $2^{nd}$ mobile terminal 100-2 may exchange the sensed signals by communications.

If the screen lock is not set in the $2^{nd}$ mobile terminal 100-2, the $2^{nd}$ mobile terminal 100-2 can output a preset screen.

<Operation 2 after Short Range Communication Connection—Security Authentication>

Figure 6:
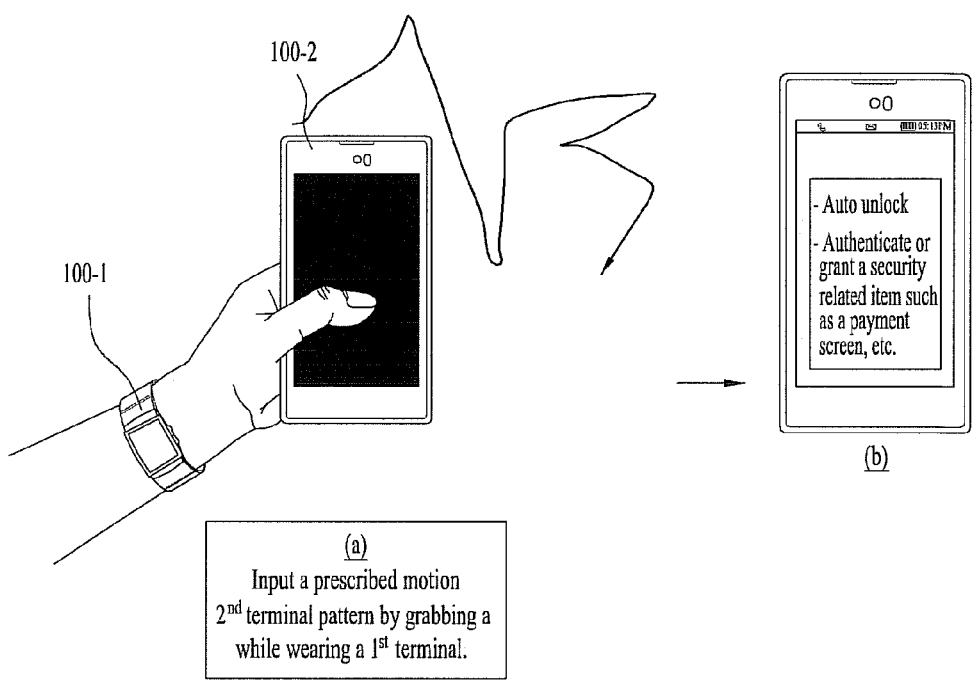
FIG. 6 is a diagram for another example of activating a prescribed function of a prescribed mobile terminal through motions sensed by mobile terminals having a short range communication connection established in-between according to one embodiment of the present disclosure.

FIG. 6 is a diagram for another example of activating a prescribed function of a prescribed mobile terminal through motions sensed by mobile terminals having a short range communication connection established in-between according to one embodiment of the present disclosure.

First of all, since a user always wears a wearable device, the wearable device may be more secure than other mobile terminals. In particular, if the wearable device requests a user authentication procedure in the course of being put on, security of the wearable device may get higher. This is because, if user authentication is performed on putting on the wearable device, user identity can be maintained until the wearable device is taken off. Therefore, according to an embodiment of the present disclosure, authentication is proposed to be performed in a manner of saving a security means (or a certificate of authentication) and the like in a wearable device having relatively high security and then, if another mobile terminal needs a security means, performing the authentication through the security means saved in the wearable device.

Referring to FIG. 6, according to one embodiment of the present disclosure, when a $2^{nd}$ mobile terminal 100-2 needs an authentication means (e.g., when a user performs authentication through the $2^{nd}$ mobile terminal 100-2), if a user wearing a $1^{st}$ mobile terminal 100-1 inputs a motion 600-1 of a prescribed pattern while grabbing the $2^{nd}$ mobile terminal 100-2, the $1^{st}$ mobile terminal 100-1 can provide an authentication means to the $2^{nd}$ mobile terminal 100-2 using the short range communication (or approve the authentication). While the 1st mobile terminal 100-1 and the 2nd mobile terminal 100-2 are connected to each other by the short range communication, if a corresponding motion pattern is detected, it is able to check that the 1st mobile terminal 100-1 and the 2nd mobile terminal 100-2 are currently used by the same user. Hence, security can be maintained despite providing the authentication means. In case of being connected to each other by the short range communication, the 1st mobile terminal 100-1 and the 2nd mobile terminal 100-2 can exchange the motion patterns, which are respectively detected by the 1st mobile terminal 100-1 and the 2nd mobile terminal 100-2, with each other through the established short range communication.

Moreover, in order to further check whether mobile terminals are used by the same user, it is able to further consider the RSSI mentioned in the foregoing description. In particular, the 2nd mobile terminal 100-2 detects a strength of a signal received from the 1st mobile terminal 100-1 and the 1st mobile terminal 100-1 detects a strength of a signal received from the 2nd mobile terminal 100-2. It is then able to further check whether the strength of the detected signal is equal to or greater than a prescribed numerical value. This is because, if the two mobile terminals are used by the same user, the two mobile terminals can be assumed as close to each other in distance.

As mentioned briefly in the foregoing description, in case that the 1st mobile terminal 100-1 is a wearable device, it is able to perform an additional authentication process in the course of wearing the corresponding device. The reason for this is that the wearable device can be assumed as used by the same user unless taken off. Therefore, according to one embodiment of the present disclosure, if a wearable device detects that it is put on a user, it is proposed to perform a user authentication process. Various methods can be applied to this authentication process. For instance, if the wearable device provided with a fingerprint sensor detects that it is put on by a user, the wearable device requires a user's fingerprint. If the fingerprint authentication is completed, it is able to finish the user authentication process. Thus, if the wearable device performs the authentication process in the course of being put on, it can work as a method of increasing security of a mobile terminal storing an important security means, a certificate of authentication and the like.

<Operation 3 after Short Range Communication Connection—Auto Deactivation Control>

According to one embodiment of the present disclosure, if it is detected that a prescribed mobile terminal keeps being used by a user, deactivation of a display screen is not performed. Generally, if a user does not apply an input to a mobile terminal for prescribed duration, the mobile terminal deactivates a display. In particular, if a display is active, it consumes a power considerably. Hence, if it is determined that a user does not use the display, it is able to prevent a waste of power in a manner of deactivating the display. Yet, although there is no input applied to a mobile terminal by a user, the user may be using the mobile terminal. For instance, a user may be watching a video having a considerably long video. For another instance, activation of a display may be required for reading a news article, a novel and the like without an additional input.

Therefore, a method of checking whether a user is using a mobile terminal without an additional input applied by the user according to one embodiment of the present disclosure is proposed. Moreover, if the mobile terminal determines that it keeps being used by the user, it is proposed that some restriction is put on deactivation of a screen. Such a restriction on a screen deactivation shall be named an auto deactivation control function.

Figure 7:
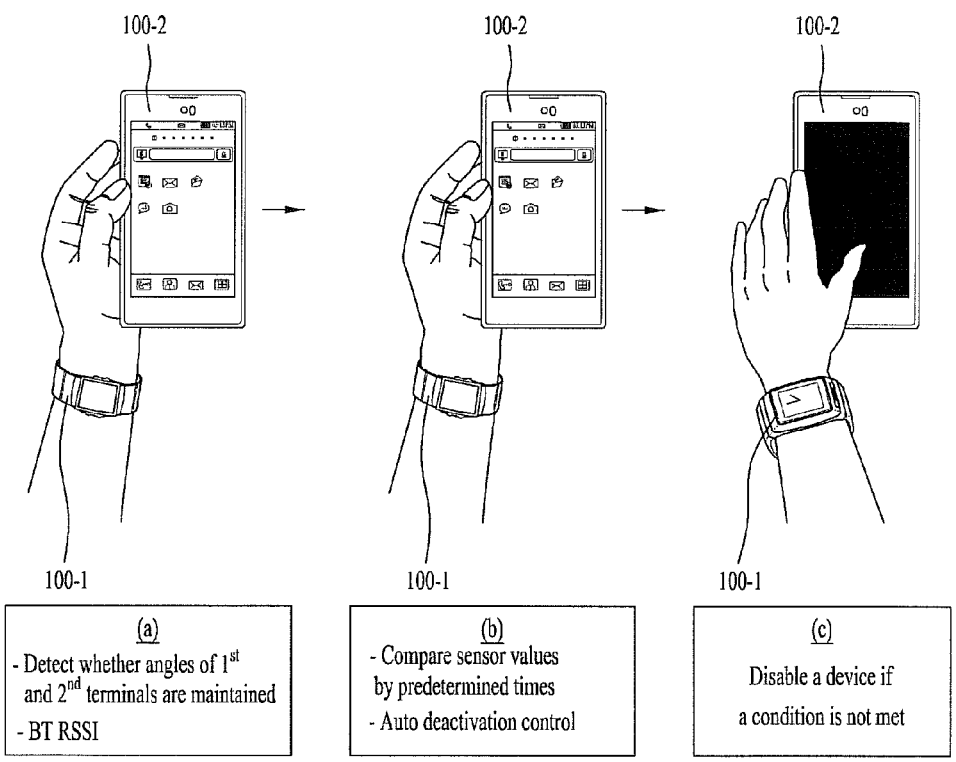
FIG. 7 is a diagram for further example of activating a prescribed function of a prescribed mobile terminal through motions sensed by mobile terminals having a short range communication connection established in-between according to one embodiment of the present disclosure.

FIG. 7 is a diagram for further example of activating a prescribed function of a prescribed mobile terminal through motions sensed by mobile terminals having a short range communication connection established in-between according to one embodiment of the present disclosure.

First of all, according to one embodiment of the present disclosure, if a user currently wearing a 1st mobile terminal 100-1 maintains a state of grabbing a 2nd mobile terminal 100-2 with a hand on which the 1st mobile terminal 100-1 is worn [i.e., if this state is detected by a sensor], the 2nd mobile terminal 100-2 can maintain the auto deactivation control function. In particular, it is determined that the user keeps using the 2nd auto deactivation control function 100-2.

According to the embodiment shown in FIG. 7, while each of the 1st mobile terminal 100-1 and the 2nd mobile terminal 100-2 attempts to make a decision to maintain the auto deactivation control function, the following signals may be predicted.

First of all, it is able to consider strengths of signals received from devices connected by short range communications. In order to determine a state that the 2nd mobile terminal 100-2 keeps being held by a user, it is able to make the corresponding determination based on the strength of the signal received from the 1st mobile terminal 100-1 worn on a wrist of the user. Hence, the 2nd mobile terminal 100-2 determines the strength of the signal received from the 1st mobile terminal 100-1 connected by the short range communication. If the strength of the signal is equal to or greater than a prescribed value, it is able to determine that the 2nd mobile terminal 100-2 keeps being used by the user.

In addition, according to one embodiment of the present disclosure, it is further proposed that the above-mentioned state is determined based on motion detected from the 1st mobile terminal 100-1 and the 2nd mobile terminal 100-2. If the 2nd mobile terminal 100-2 keeps being used by the user, a screen of the 2nd mobile terminal 100-2 may maintain a predetermined angle [i.e., a 1st detection signal]. Alternatively, a level of a motion signal sensed through the 1st mobile terminal 100-1 or the 2nd mobile terminal 100-2 may be equal to or smaller than a prescribed numerical value [i.e., a 2nd detection signal]. Hence, the 2nd mobile terminal 100-2 detects a motion detected from each of the 1st mobile terminal 100-1 and the 2nd mobile terminal 100-2. If the detected motion corresponds to the 1st or 2nd detection signal, the 2nd mobile terminal 100-2 can maintain the auto deactivation control function.

And, it is apparent that the 2nd mobile terminal 100-2 can combine the two methods mentioned in the foregoing description in order to maintain the auto deactivation control function.

When the auto deactivation control function is released, the 2nd mobile terminal 100-2 returns to a previous function and is then able to deactivate the display in case of absence of an input from the user over prescribed duration.

<Operation 4 after Short Range Communication Connection—Rotation of Display Screen>

According to a rotation function generally supported by a mobile terminal, if it is detected that a mobile terminal has been rotated through a detected mobile terminal motion, a displayed screen is rotated in response to a direction of the detected rotation [hereinafter, such a function shall be named a screen rotation function]. According to this function, while user's eyes are fixed, if a mobile terminal is rotated only, a display screen is rotated to coincide with the user's eyes. Yet, in case that user's eyes are rotated together with a rotation of a mobile terminal, an unnecessary screen rotation may occur. For instance, when a user manipulates a mobile terminal while lying on a bed, user's eyes can be rotated in the same direction of the rotation direction of the mobile terminal.

Therefore, according to an embodiment of the present disclosure, proposed is to perform a rotation function in consideration of relative rotations detected from a $1^{st}$ mobile terminal 100-1 and a $2^{nd}$ mobile terminal 100-2.

Figure 8:
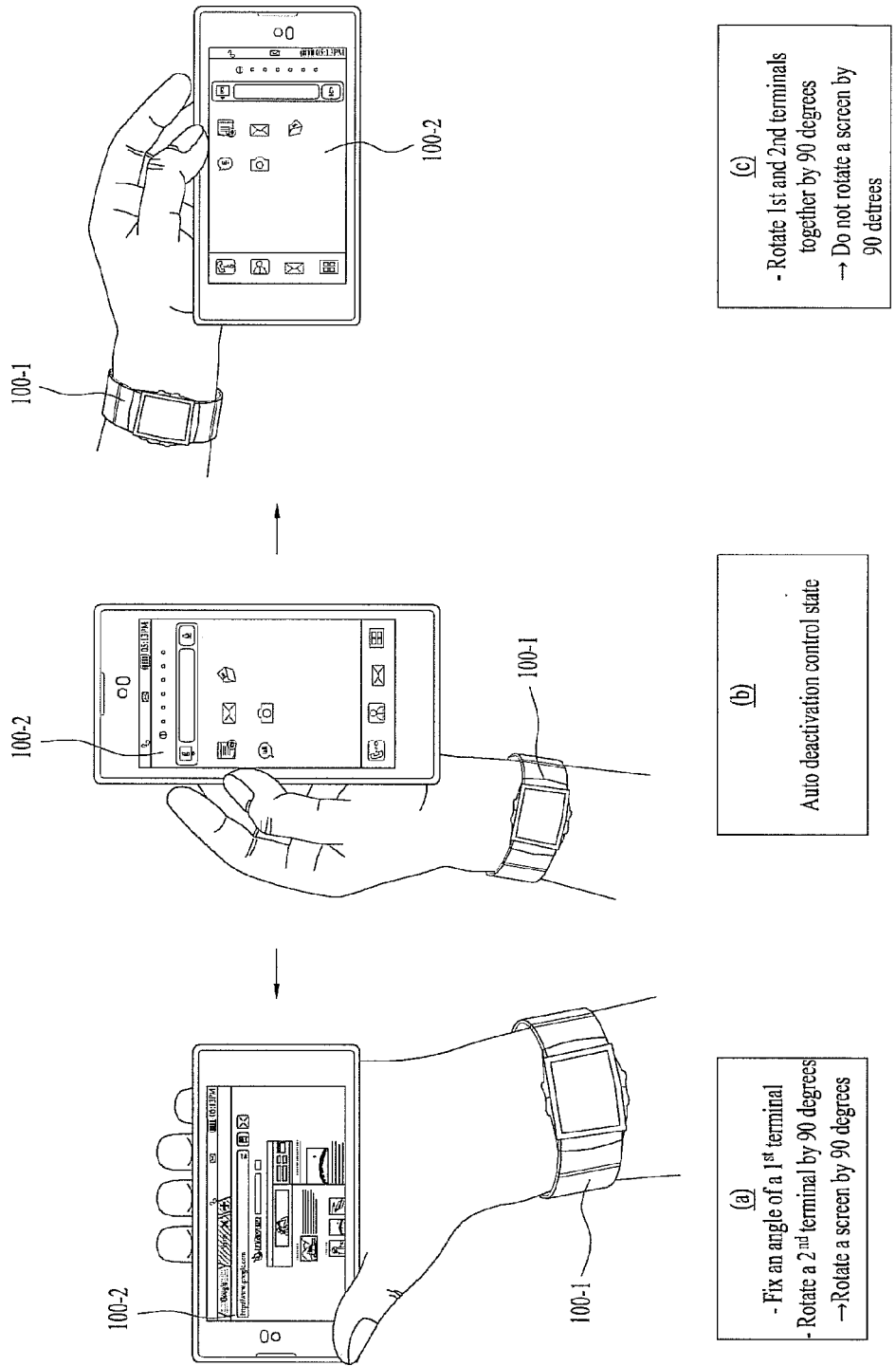
FIG. 8 is a diagram for one example of a method of performing a rotation function of a screen in consideration of relative rotation detected from a 1st mobile terminal 100-1 and a 2nd mobile terminal 100-2 according to one embodiment of the present disclosure.

FIG. 8 is a diagram for one example of a method of performing a rotation function of a screen in consideration of relative rotation detected from a $1^{st}$ mobile terminal 100-1 and a $2^{nd}$ mobile terminal 100-2 according to one embodiment of the present disclosure.

FIG. 8 (b) shows a state that the $2^{nd}$ mobile terminal 100-2 maintains an auto deactivation control function. Hence, as mentioned in the foregoing description with reference to FIG. 7, the $2^{nd}$ mobile terminal 100-2 can prevent a display from being deactivated in the state shown in FIG. 8 (b).

FIG. 8 (a) shows a state that the $2^{nd}$ mobile terminal 10-2 has been turned (e.g., turned by 90 degrees) by a user only in the state shown in FIG. 8 (b). In doing so, a rotation of the $1^{st}$ mobile terminal 100-1 is not included in a $1^{st}$ motion detected through the $1^{st}$ mobile terminal 100-1 but a rotation of the $2^{nd}$ mobile terminal 100-2 may be included in a $2^{nd}$ motion detected through the $2^{nd}$ mobile terminal 100-2. The $2^{nd}$ mobile terminal 100-2 recognizes that the rotation of the $1^{st}$ mobile terminal 100-1 is not detected through the short range communication with the $1^{st}$ mobile terminal 100-1. If the rotation of the $1^{st}$ mobile terminal 100-1 is detected, the $2^{nd}$ mobile terminal 100-2 can control the display unit to output a screen of the $2^{nd}$ mobile terminal 100-2 in a manner that the corresponding screen is outputted by being rotated. In particular, while the auto deactivation control function shown in FIG. 8 (b) is active, if the rotation of the $2^{nd}$ mobile terminal 100-2 is detected only, it is able to assume that user's eyes are not rotated.

On the contrary, FIG. 8 (c) shows a state that both of the $1^{st}$ mobile terminal 100-1 and the $2^{nd}$ mobile terminal 100-2 are simultaneously rotated (e.g., rotated by 90 degrees) by the user in the state shown in FIG. 8 (b). According to an embodiment of the present disclosure, in case of detecting rotations of at least two mobile terminals among a plurality of mobile terminals connected to each other by the short range communications, it is able to determine that user's eyes are rotated together with the rotations. Hence, if it is determined that both of the $1^{st}$ mobile terminal 100-1 and the $2^{nd}$ mobile terminal 100-2 are rotated in the motions detected through the $1^{st}$ mobile terminal 100-1 and the $2^{nd}$ mobile terminal 100-2, the $2^{nd}$ mobile terminal 100-2 may not perform the screen rotation function. Thus, in case that a user wearing the $1^{st}$ mobile terminal 100-1 on his wrist lies on his side, it may be able to prevent an unnecessary rotation of a screen in this situation.

Meanwhile, the above-mentioned screen rotation function may not be activated in the screen of the mobile terminal is locked.

<Operation 5 after Short Range Communication Connection—Sharing Event Alarm>

The proposed methods according to embodiments of the present disclosure relate to methods of extending functions among a plurality of mobile terminals forming a group by being connected to each other by short range communications. Namely, the inconvenience due to the limited functions of a wearable device can be reduced using another mobile terminal connected by the short range communication. In particular, according to one embodiment of the present disclosure, if it is determined that a user is using another mobile terminal connected to a wearable device, it is proposed that an alarm of an event occurring in the corresponding wearable device is outputted through the mobile terminal currently used by the user. This is to ease the inconvenience of the limited functions of the wearable device. The alarm may be an event notification of various types, associated with various types of applications, for example, phone, text, email or another appropriate type of application or function.

Figure 9:
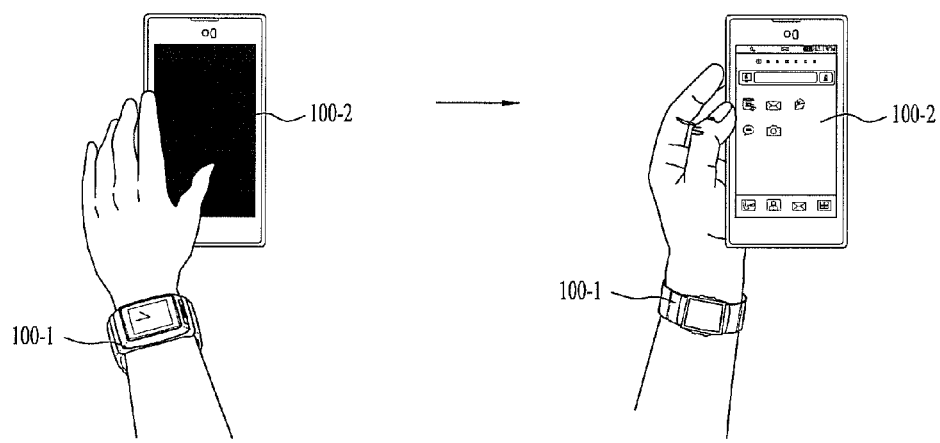
FIG. 9 is a diagram for one example of a method of providing an event alarm occurring in a 1st mobile terminal 100-1 through a 2nd mobile terminal 100-2 according to one embodiment of the present disclosure.

FIG. 9 is a diagram for one example of a method of providing an event alarm occurring in a $1^{st}$ mobile terminal 100-1 through a $2^{nd}$ mobile terminal 100-2 according to one embodiment of the present disclosure. In FIG. 9, assume that the $1^{st}$ mobile terminal 100-1 and the $2^{nd}$ mobile terminal 100-2 are connected to each other by a short range communication. Hence, in the state shown in FIG. 9 (a), each of the $1^{st}$ mobile terminal 100-1 and the $2^{nd}$ mobile terminal 100-2 can individually inform a user of an alarm of an event occurring in the corresponding mobile terminal.

FIG. 9 (b) shows a state that the auto lock described with reference to FIG. 5 is released. According to one embodiment of the present disclosure, if the $2^{nd}$ mobile terminal 10-2 is being used by a user, it is proposed that an event indication received through the $1^{st}$ mobile terminal 100-1 is outputted through the $2^{nd}$ mobile terminal 100-2 as well as an event alarm occurring through the $2^{nd}$ mobile terminal 100-2 [hereinafter, such a function shall be named an event alarm push function]. The reason for this is that, if a device currently used by a user is the $2^{nd}$ mobile terminal 100-2, the $1^{st}$ mobile terminal 100-1 may be assumed as not used currently. Since the back of the hand faces in a backside direction of the $2^{nd}$ mobile terminal 100-2 in the course of using the $2^{nd}$ mobile terminal 100-2, as shown in FIG. 9, a display direction of the $1^{st}$ mobile terminal 100-1 may lie in the backside direction of the $2^{nd}$ mobile terminal 100-2, thereby not being included in user's eyes. In particular, if it is determined that the $2^{nd}$ mobile terminal 100-2 keeps being used by the user, the $2^{nd}$ mobile terminal 100-2 receives an event occurrence from the $1^{st}$ mobile terminal 100-1 and is then able to output an alarm of the received event. In doing so, if the received event is a reception of a call signal, the $2^{nd}$ mobile terminal 10-2 further receives such additional information as a sender's contact number of the call signal and the like and is then able to further output the received additional information. Moreover, in case that the received event includes a reception of a message, the $2^{nd}$ mobile terminal 100-2 further receives a content of the message from the $1^{st}$ mobile terminal 100-1 and is then able to output the received message content together with the output of the event alarm.

Meanwhile, in order to determine whether the $2^{nd}$ mobile terminal 100-2 keeps being used by the user, the $2^{nd}$ mobile terminal 100-2 can make the determination on the same condition for the determination on maintaining the auto deactivation control function described with reference to FIG. 7.

In particular, it is able to consider a strength of a signal received by the $2^{nd}$ mobile terminal 100-2 from each of the devices connected to the $2^{nd}$ mobile terminal 100-2 by short range communications. The reason for this is that, in order to determine the state that the $2^{nd}$ mobile terminal 100-2 keeps being held by the user, the determination can be made based on the strength of the signal received from the $1^{st}$ mobile terminal 100-1 worn on a wrist of the user. Hence, the $2^{nd}$ mobile terminal 100-2 determines the strength of the signal received from the 1st mobile terminal 100-1 connected thereto by the short range communication. If the strength of the received signal is equal to or greater than a prescribed value, the 2nd mobile terminal 100-2 determines that it keeps being used by the user and is then able to maintain the event alarm push function.

In addition, according to one embodiment of the present disclosure, it is further proposed that the aforementioned state is determined through motions detected from the 1st mobile terminal 100-1 and the 2nd mobile terminal 100-2. If the 2nd mobile terminal 100-2 keeps being used by the user, the screen of the 2nd mobile terminal 100-2 may maintain a predetermined angle [i.e., 1st detection signal]. Moreover, a level of a motion signal sensed through the 1st mobile terminal 100-1 or the 2nd mobile terminal 100-2 may be equal to or smaller than a prescribed numerical value [i.e., 2nd detection signal]. Hence, the 2nd mobile terminal 100-2 detects motions respectively detected from the 1st mobile terminal 100-1 and the 2nd mobile terminal 100-2. If the detected motions correspond to the 1st detection signal and the 2nd detection signal, the 2nd mobile terminal 100-2 can maintain the event alarm push function.

Meanwhile, while the 2nd mobile terminal 100-2 maintains the event alarm push function, the 1st mobile terminal 100-1 can deactivate the screen. The reason for this is that, since the 2nd mobile terminal 100-2 is assumed as keeping being used by the user in order to maintain the event alarm push function, the 1st mobile terminal 100-1 can be further assumed as not used.

According to one embodiment of the present disclosure, it is able to further use an event alarm push function for an event received in a state that there is no device connected to a prescribed mobile terminal by a short range communication. In particular, it is able to assume that the 1st mobile terminal 100-1 and the 2nd mobile terminal 100-2 are not connected to each other by the short range communication in FIG. 9. In this disconnected state, each of the 1st mobile terminal 100-1 and the 2nd mobile terminal 100-2 can individually receive and store each event. Thereafter, if the short range communication is restored between the 1st mobile terminal 100-1 and the 2nd mobile terminal 100-2, as shown in FIG. 9 (*b*), the 1st mobile terminal 100-1 delivers an alarm for a stored event to the 2nd mobile terminal 100-2 and the 2nd mobile terminal 100-2 is then able to output an alarm for the delivered event. Due to the limited functions of the wearable device, if the number of the received events is excessive, it may be inconvenient to check the received evens at a time. Hence, the 1st mobile terminal 100-1 stores the reception of the event and then delivers the stored event to the 2nd mobile terminal 100-2 as soon as connected to the 2nd mobile terminal 100-2, thereby enabling the user to check the event through the 2nd mobile terminal 100-2.

In delivering the alarm of the event in the above-mentioned manner, an application supported by the 1st mobile terminal 100-1 may not be supported by the 2nd mobile terminal 100-2. In this case, according to one embodiment of the present disclosure, the following process is further proposed. First of all, the corresponding application is activated in the 1st mobile terminal 100-1. Secondly, a screen is rendered in the 1st mobile terminal 100-1. Finally, the rendered screen is delivered to the 2nd mobile terminal 100-2. For example, the 1st mobile terminal 100-1 delivers the rendered screen to the 2nd mobile terminal 100-2 using Miracast (i.e., a type of a wifi display).

In one embodiment of the present disclosure mentioned in the foregoing description, if it is determined that the user is using the 2nd mobile terminal 100-2 through the 1st mobile terminal 100-1 and the 2nd mobile terminal 100-2, it is proposed that the display through the 1st mobile terminal 100-1 is deactivated. In addition to this embodiment, according to one embodiment of the present disclosure, the following process is further proposed. First of all, while the user is using the 2nd mobile terminal 100-2, an alarm of an event occurring in the 1st mobile terminal 100-1 is outputted through the 2nd mobile terminal 100-2. Thereafter, if it is determined that the user is watching the screen of the 1st mobile terminal 100-1, a deactivated screen is activated and a detailed content of the received event is outputted to the activated display of the 1st mobile terminal 100-1.

Figure 10:
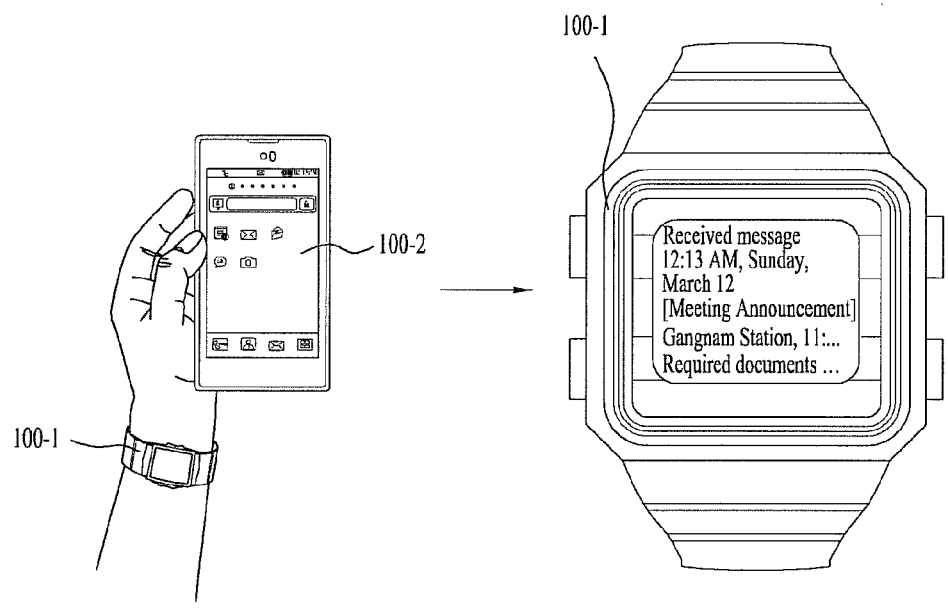
FIG. 10 is a diagram for one example of a method of sharing an alarm of an event between mobile terminals connected to each other by a short range communication according to one embodiment of the present disclosure.

FIG. 10 is a diagram for one example of a method of sharing an alarm of an event between mobile terminals connected to each other by a short range communication according to one embodiment of the present disclosure.

Referring to FIG. 10, while a full screen is utilized for playing a game, a video or the like through the 2nd mobile terminal 100-2, a user can check details of a received event not through the 2nd mobile terminal 100-2 but through the 1st mobile terminal 100-1.

When an alarm of an event received through the 1st mobile terminal 100-1 and/or the 2nd mobile terminal 100-2 is outputted to at least one of the 1st mobile terminal 100-1 and the 2nd mobile terminal 100-2, if a rotation is detected from the 1st mobile terminal 100-1 and/or the 2nd mobile terminal 100-2, it is proposed that the 1st mobile terminal 100-1 outputs a detailed content of the received event. If the received event is a reception of a text message, a content of the received text message may be included in the detailed content [FIG. 10 (*b*)].

In order to determine whether a user watches a screen of the 1st mobile terminal 100-1, the 1st mobile terminal 100-1 and/or the 2nd mobile terminal 100-2 can detect a sensing signal as follows.

First of all, while the auto deactivation control function described with reference to FIG. 7 is maintained, if a rotational motion is detected through the 1st mobile terminal 100-1 and/or the 2nd mobile terminal 100-2, the 1st mobile terminal 100-1 and the 2nd mobile terminal 100-2 can determine that a user is watching the screen of the 1st mobile terminal 100-1. In particular, if the rotational motion is detected from the 1st mobile terminal 100-1 only despite that the rotational motion is not detected from the 2nd mobile terminal 100-2, it is able to assume that the user is watching the screen of the 1st mobile terminal 100-1 after grabbing the 2nd mobile terminal 100-2 with another hand. Hence, in order to determine that the user is watching the screen of the 1st mobile terminal 100-1, a motion to be intensively determined may include the rotational motion of the 1st mobile terminal 100-1 itself.

Figure 11:
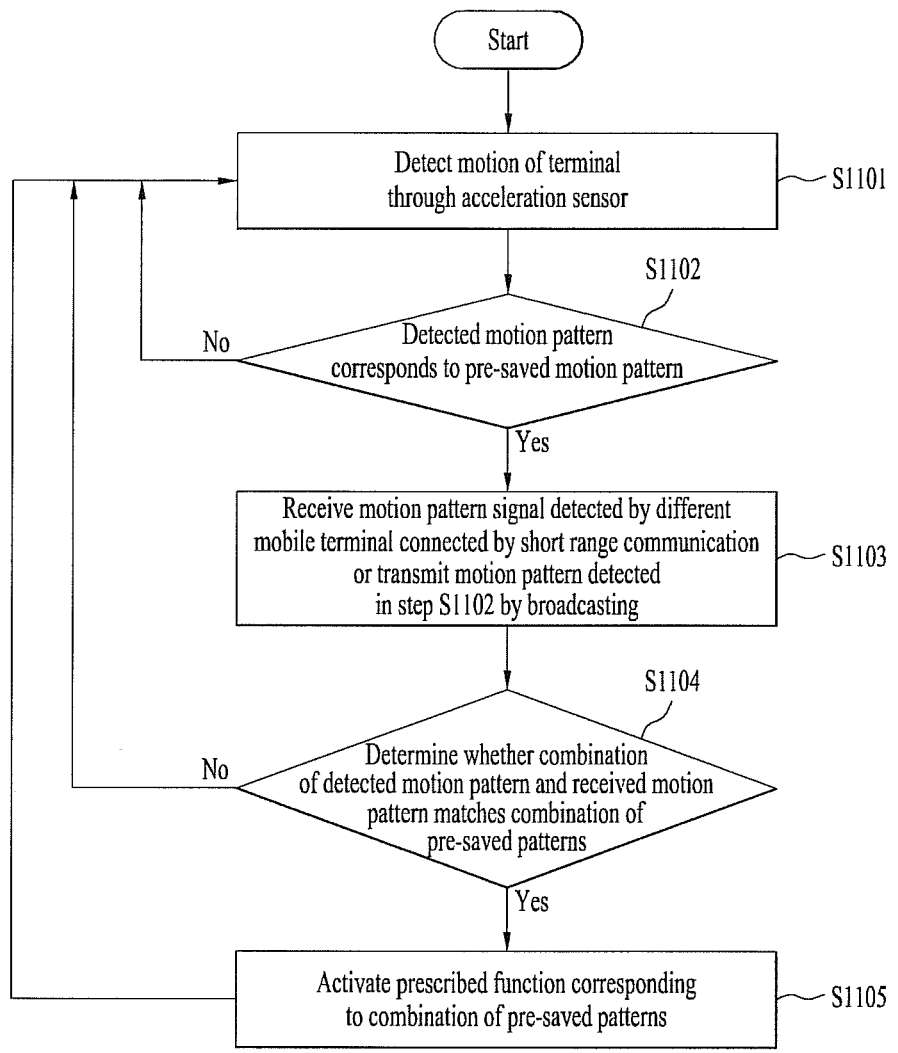
FIG. 11 is a flowchart for a method of performing a prescribed function based on a detected motion pattern in a mobile terminal according to one embodiment of the present disclosure.

FIG. 11 is a flowchart for a method of performing a prescribed function based on a detected motion pattern in a mobile terminal according to one embodiment of the present disclosure.

Referring to FIG. 11, in a step S1101, the mobile terminal 100 can detect a pattern of its motion through an acceleration sensor. In doing so, it is apparent that the motion pattern can be detected through other sensors as well as through the acceleration sensor. For instance, at least one of a gyro sensor, an atmospheric pressure sensor, or a geomagnetic sensor can be used to detect the motion pattern.

If the motion pattern detected in the step S1101 is identical to a prescribed pattern previously saved, the routine may go to a step S1103, in step S1102. If the motion pattern detected in the step S1101 is not identical to the prescribed pattern previously saved, the controller 180 may return to the step S1101.

In the step S1103, the controller 180 can receive a motion pattern signal detected by a different mobile terminal. In doing so, the different mobile terminal may transmit the motion pattern signal detected by itself by broadcasting (e.g., BLE broadcasting transmission, etc.). Alternatively, in the step S1103, the controller 180 may broadcast the detected motion pattern to the different mobile terminal.

In a step S1104, the controller 180 determines whether a combination of the detected motion pattern and the motion pattern received in the step S1103 matches a combination of the previously saved motion pattern. If they match each other, the controller 180 can go to a step S1105. Otherwise, the controller 180 may go to the step S1101.

In the step S1105, the controller 180 can activate a prescribed function corresponding to the previously saved motion pattern combination.

<Study Function of Motion Pattern>

In the specification described so far, it is proposed that a prescribed function is activated based on a motion detected through a mobile terminal connected by a short range communication. Although a preset motion pattern may be included in the aforementioned prescribed motions, if there is a motion repeatedly inputted by a user, the repeated motion is memorized and a function corresponding to the memorized motion can be then activated. Therefore, according to one embodiment of the present disclosure mentioned in the following description, a method of activating a prescribed function based on a result of analyzing a user's motion pattern is proposed (hereinafter, such a method is named a motion pattern studying function).

Figure 12:
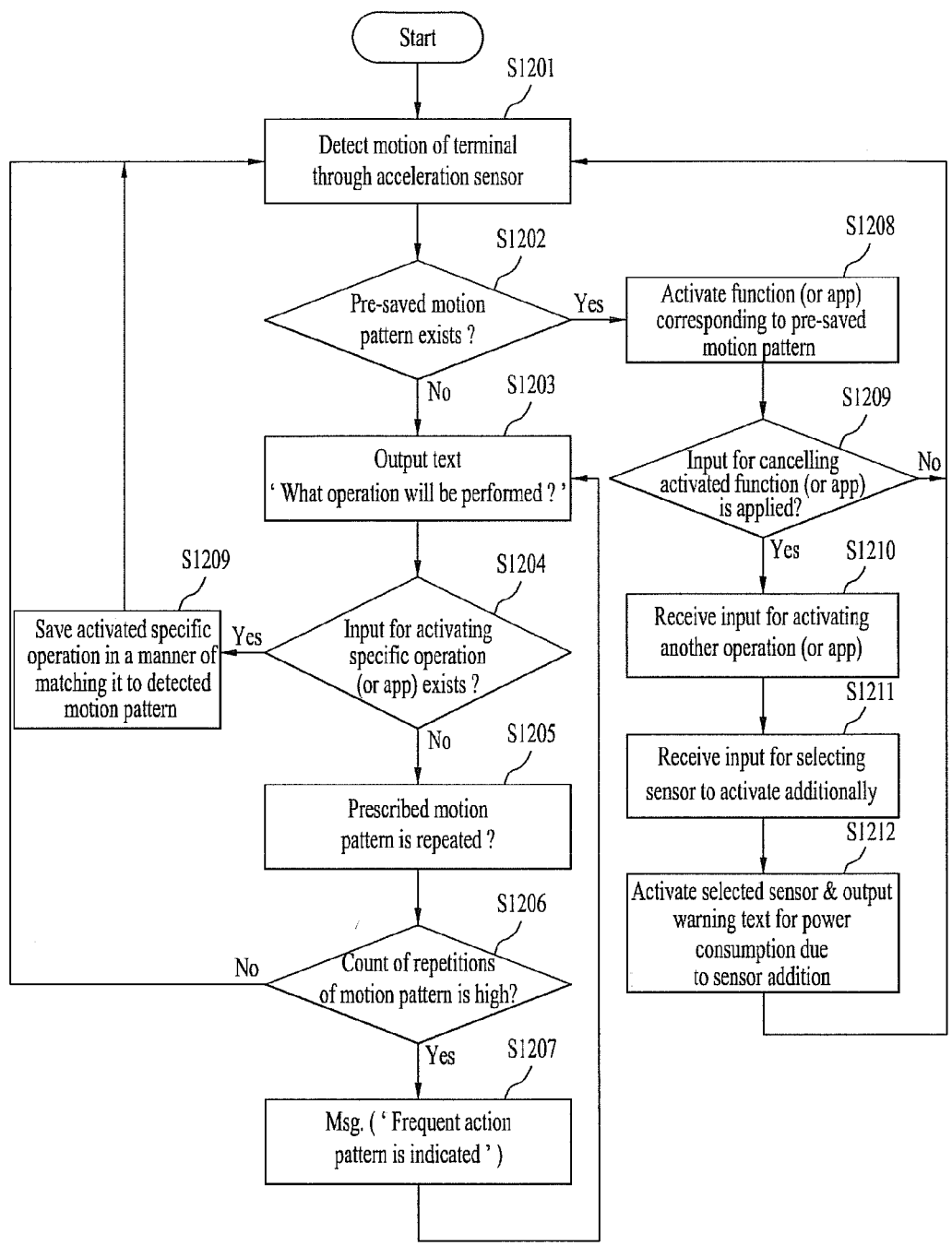
FIG. 12 is a flowchart for a method of analyzing a motion pattern in a mobile terminal according to one embodiment of the present disclosure.

FIG. 12 is a flowchart for a method of analyzing a motion pattern in a mobile terminal according to one embodiment of the present disclosure.

Referring to FIG. 12, in a step S1201, the mobile terminal 100 can detect a pattern of its motion through an acceleration sensor. In doing so, it is apparent that the motion pattern can be detected through other sensors as well as through the acceleration sensor. For instance, at least one of a gyro sensor, an atmospheric pressure sensor, or a geomagnetic sensor can be used to detect the motion pattern. In a step S1202, the mobile terminal 100 checks whether a pattern corresponding to a previously saved motion exists in the motion detected in the step S1201. In this case, the previously saved motion pattern may be linked to a prescribed function of the mobile terminal 100.

If the mobile terminal 100 determines that the pattern corresponding to the previously saved motion exists in the motion detected in the step S1201, the mobile terminal 100 goes to a step S1208. Subsequently, in the step S1208, the mobile terminal 100 can activate a prescribed function linked to the previously saved motion pattern. In particular, a user can input a motion pattern as an input for activating a prescribed function of the mobile terminal 100.

On the other hand, in a step S1209, the controller 180 determines whether there is an activation cancel input for the operation or application activated in the step S1208. In particular, the controller 180 determines whether there is a user cancel input due to a wrong recognition of the motion pattern. Hence, if there is the activation cancel input for an auto-activated operation or application, the controller 180 goes to a step S1210. Otherwise, the controller 180 returns to the step S1201.

In the step S1210, the controller 180 receives an input for activation of another operation or application from the user. This is not an operation for the motion pattern operated by the wrong recognition but an operation for receiving an input of an activation of an operation or application actually intended to be inputted by the user. Moreover, since a motion attributed to a general use of the mobile terminal may be recognized instead of an operation for activating a specific operation or application, it may be necessary to filter off such an operation.

In doing so, therefore, according to one embodiment of the present disclosure, it is proposed that a step of receiving a selection of activation of an additional sensor from a user is further included.

In a step S1211, the controller 180 can propose an additional sensor activation in order to prevent the wrong recognition of the motion pattern recognized in the step S1201. This state diagram is described in detail with reference to FIG. 14 as follows.

Figure 14:
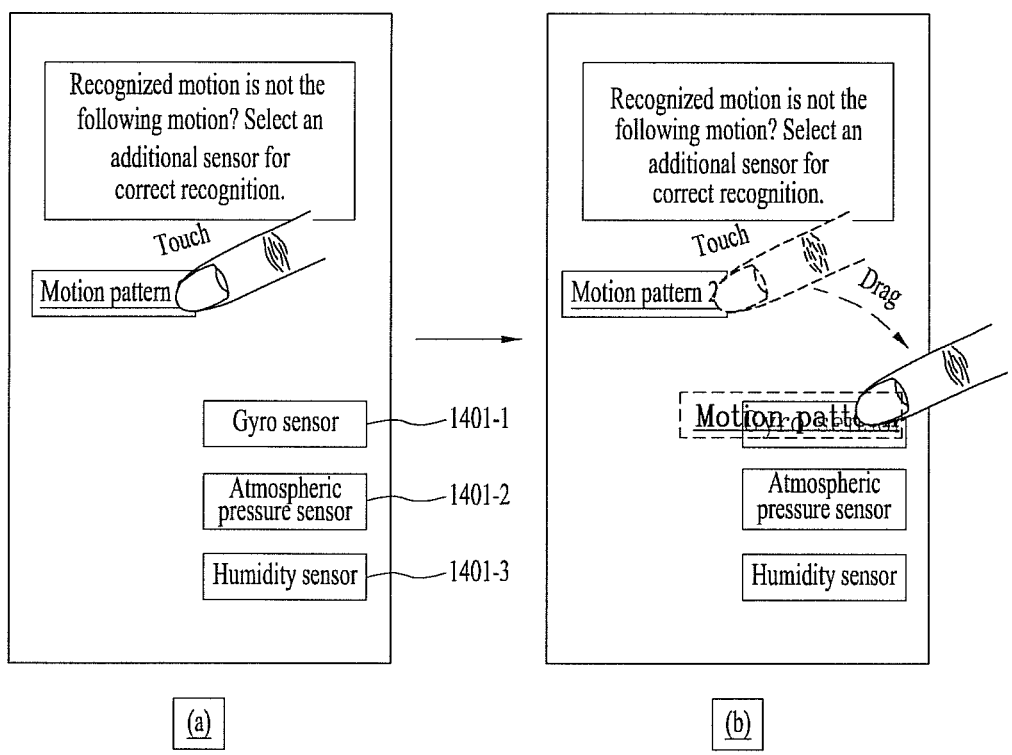
FIG. 14 is a diagram for screen configurations of a process for receiving an input of a selection for activation of an additional sensor from a user according to one embodiment of the present disclosure.

FIG. 14 is a diagram for screen configurations of a process for receiving an input of a selection for activation of an additional sensor from a user according to one embodiment of the present disclosure.

Referring to FIG. 14 (*a*), according to one embodiment of the present disclosure, it is able to output a text for indicating that a motion pattern is wrongly recognized and making a request for an additional sensor to a user.

And, the controller 180 can output candidates 1401-1 to 1401-3 for an additional sensor that can be activated as well.

If receiving a selection for activating an operation (or application) of a prescribed one of the additional sensor candidates 1401-1 to 1401-3 from a user, the controller 180 can go to a step S1212.

In particular, for instance, if a user takes an action for bringing a mobile terminal to a location close to his mouth for voice recognition, the mobile terminal may wrongly recognize a detected motion pattern as an operation of receiving a call signal. Hence, in order to cope with such a wrong recognition, in case of receiving an input of activating a gyro sensor additionally from the user, by further considering a rotational level of the mobile terminal and a call signal for the voice recognition, it may be able to clearly discriminate the two motion patterns from each other without wrong recognition.

In the step S1212, the controller 180 activates the selected additional sensor and can output a text indicating that power consumption may increase in case of activating the additional sensor through the display unit.

Referring now to the step S1202, if determining that no pattern matching the previously saved motion pattern exists among the detected motion patterns, the mobile terminal 100 goes to the step S1203. In the step S1203, it is able to output a text for requesting a user's intention in response to the detected motion pattern. In particular, it is able to output a message that requests what is the function intended by the user to be performed through the input of the detected motion pattern. In more particular, this message text may include a message 'What kind of operation will be performed?'.

On the other hand, in detecting a specific motion pattern in the above manner, the aforementioned steps S1201 to S1203 may not be performed in response to a motion that may be generated by a general use of the mobile terminal 100. The reason for this is that, if the aforementioned steps are performed in response to all detected motion patterns, it may request a user to activate a function for an unnecessary pattern. Therefore, according to one embodiment of the present disclosure, it is able to perform the steps S1201 to S1209 in response to a unique motion pattern enough to be regarded as a motion pattern inputted by a user. For instance, the unique motion pattern may include one of an action of shaking the mobile terminal 100 grabbed with user's hand at least twice in right and left directions, an action of rotating the mobile terminal 100 over a prescribed angle, and the like. Moreover, the steps shown in FIG. 12 may be performed for the combination of motion patterns inputted through a plurality of mobile terminals connected to each other by the short range communications.

Moreover, in case of an action inputted in a specific environment as a reception of a call signal, a reception of a message alarm and the like, it may be detected as a separate pattern. In particular, even if an action of shaking the mobile terminal 100 is performed in a general environment, any functions may not be activated. Yet, in case of inputting an action of lifting the mobile terminal 100 in an environment of receiving a call signal, the mobile terminal 100 can make a response to the received call signal in response to the inputted action. For another instance, if an action of shifting the $2^{nd}$ mobile terminal 100-2 with a hand having the $1^{st}$ mobile terminal 100-1 worn thereon is inputted, a call signal can be received.

In a step S1204, the controller 180 of the mobile terminal 100 can receive an input of an action of activating a specific operation (or application) from a user. In doing so, the controller 180 of the mobile terminal 100 can output candidates (e.g., recommended operations, recommended application) for the specific operation or application, which can be expected to be activated by a user in performing the step S1204, to the screen. And, the controller 180 of the mobile terminal 100 can receive an input for selecting one of the candidates from the user. Thus, screen configurations for outputting candidates for a specific operation or application are described in detail with reference to FIG. 13 as follows.

Figure 13:
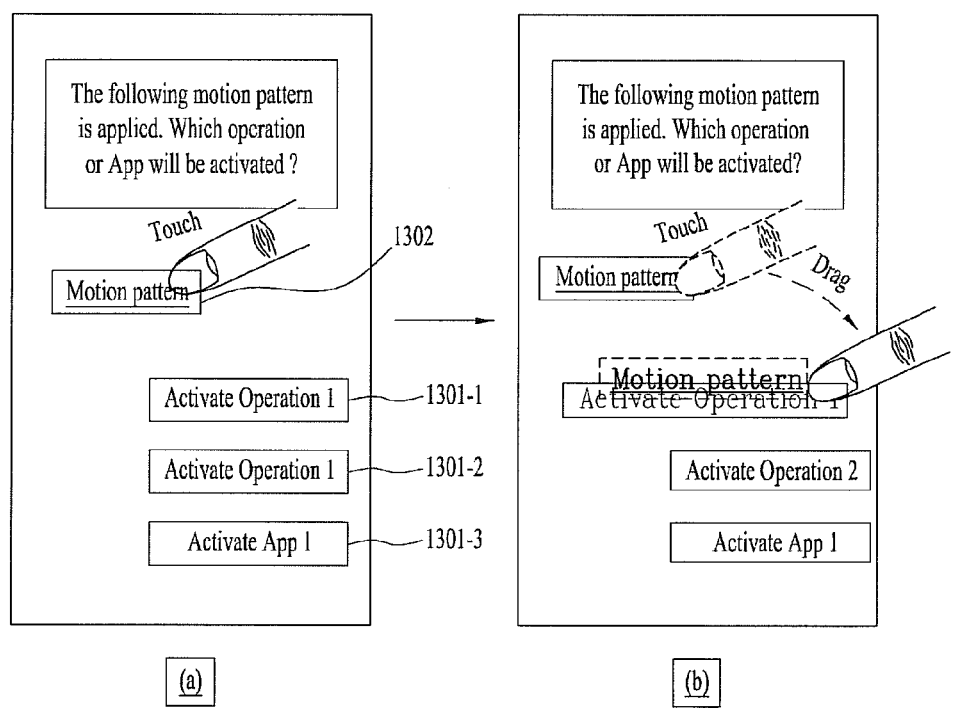
FIG. 13 is a diagram for screen configurations of a process for detecting a prescribed motion pattern and, if an operation or application associated with the detected prescribed motion pattern does not exist, recommending the detected prescribed motion pattern according to one embodiment of the present disclosure.

FIG. 13 is a diagram for screen configurations of a process for detecting a prescribed motion pattern and, if an operation or application associated with the detected prescribed motion pattern does not exist, recommending the detected prescribed motion pattern according to one embodiment of the present disclosure. For clarity, FIG. 13 just shows a state outputted through a display of a mobile terminal without illustrating a configuration of the mobile terminal.

Referring to FIG. 13 (a), it is able to output a text indicating that an operation or application has not been designated to an inputted prescribed motion pattern. And, it is also able to output expected operation candidates 1301-1 to 1301-3 of an operation or application together with this text.

If a user selects a prescribed operation (or application) from the operation candidates 1301-1 to 1301-3, the controller 180 can go to a step S1209.

Regarding the step of receiving the selection, it is able to receive an input of touching one of the operation candidates 1301-1 to 1301-3. Alternatively, after an object 1302 indicating a motion pattern has been touched, the touched object is dropped on a location, thereby selecting an operation candidate corresponding to the dropped location. Thus, the selection may be non-limited by the above-mentioned selecting method.

Referring now to FIG. 12, in the step S1209, the controller 180 can control the activation of the operation (or application) selected in the step S1204 to be saved in a manner of being linked to the detected motion pattern. Hence, in case of detecting that the saved motion pattern is inputted by returning to the step S1201, the controller 180 can directly activate the operation (or application) linked and saved in the step S1209 [i.e., the activation in the step S1208].

On the other hand, if any selections are not received from the user in the step S1204, the controller 180 can go to the step S1205. In the step S1205, the controller 180 can determine whether the detected pattern is a repeatedly detected pattern or a temporarily inputted pattern. This determining step can be performed in a manner of saving input patterns applied through the sensing unit 140 in part and then comparing the applied patterns to the saved patterns.

In a step S1206, if the motion pattern determined in the step S1205 is repetitive, the controller 180 goes to a step S1207. If the motion pattern determined in the step S1205 is not a repetitive pattern, the controller 180 can go to the step S1201.

In the step S1206, the controller 180 can output a message that informs the user that the detected motion pattern is the repetitive pattern. As the message indicates that the repetitive motion pattern is being inputted, it can make a request to the user in response to whether to activate a specific function. Thereafter, the controller 180 can go back to the step S1203.

<Switching Operating Mode of Mobile Terminal Automatically by Analyzing Motion Pattern>

According to an embodiment mentioned in the following description, proposed is a method of detecting a level of a motion through a plurality of mobile terminals connected to each other by short range communications and then automatically switching an operating mode of a mobile terminal depending on the detected level of the motion or activating a prescribed function depending on the detected level of the motion. In particular, in the example described with reference to the accompanying drawings, a case of connecting a wearable device and a mobile terminal to each other by a short range communication is explained, by which a type of the mobile terminal may be non-limited. For instance, it is apparent that the present disclosure is applicable to mobile terminals of various types capable of analyzing motion patterns.

FIG. 15 is a diagram for a $1^{st}$ example of a process for detecting motion levels of a wearable device and a tablet PC and then switching an operating mode of a mobile terminal in response to the detected motion levels according to one embodiment of the present disclosure. In the drawing, a level of a motion is divided into $1^{st}$ to $3^{rd}$ levels, by which the level of the motion may be non-limited.

Referring to FIG. 15, as a motion detected from each of a wearable device and a tablet PC corresponds to a $1^{st}$ level, if it is determined that there is almost no motion, a controller of each of the devices can switch an operating mode to a sleep care mode. In this case, the sleep care mode is the mode entered when it is determined that a user is in a sleep. In the sleep care mode, an optimal alarm time is automatically set by analyzing a sleep pattern or a rest time can be provided based on a schedule. If the sleep care mode continues over a prescribed duration, an output of an event alarm is changed into vibration from sound, thereby minimizing interruption of a user's sleep.

In case that a motion for the tablet PC is detected as the $2^{nd}$ level despite that a motion for the wearable device is detected as the $1^{st}$ level, it is able to assume a situation that the wearable device has not been put on yet. As mentioned in the foregoing description, since the wearable device can have more security means or more authentication means, the security or authentication means may be possibly exposed to other persons. Hence, the controller 180 of each of the wearable device and the tablet PC can switch its operating mode to a secure mode. In the secure mode, a user's authentication means can be reinforced or a screen state can enter a locked state.

If the motion for the tablet PC is detected as the $1^{st}$ level despite that the motion for the wearable device is detected as the $2^{nd}$ level, it is able to assume a situation that a user wears the wearable device only without grabbing the tablet PC, i.e., the user is in an indoor space. Hence, the controller 180 of each of the wearable device and the tablet PC can switch its operating mode to an indoor mode and is able to perform such a function as a function of attempting an auto-connection to WiFi, a function of changing a main menu or a contact list, a function of setting a vibration mode, a function of connecting a wired phone call, a function of turning off a GPS power and the like.

If the motion for the tablet PC is detected as the $1^{st}$ level despite that the motion for the wearable device is detected as the $3^{rd}$ level, it is able to assume a situation that a user is exercising while wearing the wearable device. Hence, the controller 180 of each of the wearable device and the tablet PC can switch an operating mode to an activity mode. In the activity mode, the controller 180 of each of the wearable device and the tablet PC may automatically activate calorie calculation or play a music recommended for the exercising moves.

In case that the motions of both of the wearable device and the tablet PC are detected as the $2^{nd}$ level, the controller 180 of each of the wearable device and the tablet PC may operate in usual mode (i.e., normal operation mode).

In case that the motions of both of the wearable device and the tablet PC are detected as the $3^{rd}$ level, the controller 180 of each of the wearable device and the tablet PC may operate in outdoor mode. In the outdoor mode, the controller 180 may activate an application for a moving distance measurement or provide a user with a location based service.

FIG. 16 is a diagram for a $2^{nd}$ example of a process for detecting motion levels of a wearable device and a tablet PC and then switching an operating mode of a mobile terminal in response to the detected motion levels according to one embodiment of the present disclosure.

Referring to FIG. 16, in case that the motions of both of the wearable device and the tablet PC are detected as the $2^{nd}$ level, the controller 180 of each of the wearable device and the tablet PC may enter a location based service mode. In the location based service mode, the controller 180 of each of the wearable device and the tablet PC activates a GPS function and is able to activate location based functions (e.g., a map application, etc.).

In case that the motions of both of the wearable device and the tablet PC are detected as the $1^{st}$ level, the controller 180 of each of the wearable device and the tablet PC may enter the indoor mode. Additionally, the controller 180 of each of the wearable device and the tablet PC can recognize that it is located at home based on a location recognized in the aforementioned location based service mode. In the indoor mode, the controller 180 of each of the wearable device and the tablet PC can switch its operating mode to an indoor mode and is able to perform such a function as a function of attempting an auto-connection to WiFi, a function of changing a main menu or a contact list, a function of setting a vibration mode, a function of connecting a wired phone call, a function of turning off a GPS power and the like.

If the motion for the wearable device maintains one of the $1^{st}$ level and the $2^{nd}$ level repeatedly despite that the motion for the table PC maintains the $1^{st}$ level continuously, the controller 180 of each of the wearable device and the tablet PC can enter a sleep pattern analysis mode. In this mode, assuming that a user is in a sleep, a motion or pattern of the sleep is recorded and a result of the recording can be provided to the user. Particularly, the recorded motion quantity can be provided for the evaluation of a quality of sleep and information on an improved extent of a current sleep can be additionally provided in comparison with a past sleep record.

In the sleep pattern analysis mode, when an alarm time previously set up by a user approaches, if a motion quantity for the wearable device is detected as equal to or greater than a prescribed numerical value, the controller can activate an alarm by recognizing that the user is awaking from a sleep to some extent [alarm auto activation mode]. While a person sleeps, he undergoes an interval of a deep sleep and an interval of a light sleep. A case of setting an alarm to go off in the deep sleep interval is more effective than a case of setting an alarm to go off in the light sleep interval.

If the motion for the tablet PC is detected as the $1^{st}$ level despite that the motion for the wearable device is detected as the $3^{rd}$ level, the controller 180 of each of the wearable device and the tablet PC is proposed to deactivate the tablet PC temporarily. And, the controller 180 of each of the wearable device and the tablet PC can control alarms for the events occurring in the wearable device and the tablet PC to be outputted through the wearable device. In this tablet temporary deactivation mode, if an input of tapping the wearable device is received, the controller 180 of the tablet PC can output a sound or vibration alarm to indicate its location [tablet search mode].

If the motion for the tablet PC is detected as the $2^{nd}$ level despite that the motion for the wearable device is detected as the $3^{rd}$ level, the controller 180 of each of the wearable device and the tablet PC can enter a tablet activation mode. In this mode, since it is convenient to check an occurring event through the tablet PC which is functionally extended more than the wearable device, all alarms of the events occurring through the wearable device and the tablet PC can be outputted through the tablet PC.

Meanwhile, if the wearable device recognizes that it approaches close to a different device, the wearable device can attempt a connection to the different device by a short range communication with the different device. For instance, when the wearable device approaches an electric cooker by NFC (near field communication), the controller 180 of the wearable device can ate3 mpt to the electric device through an NFC function. If the connection is successfully established, the controller 180 of the wearable device can further output a message indicating that the connection to the corresponding device has been successfully established.

Meanwhile, if the motion of the wearable device is detected as the $2^{nd}$ level, the wearable device can operate in motion recognition mode. In case of receiving a prescribed motion pattern in the motion recognition mode, the wearable device can further perform a function corresponding to the prescribed motion pattern.

FIG. 17 is a diagram for a $3^{rd}$ example of a process for detecting motion levels of a wearable device and a tablet PC and then switching an operating mode of a mobile terminal in response to the detected motion levels according to one embodiment of the present disclosure.

First of all, since a location based mode can refer to the former description with reference to FIG. 16, its details shall be omitted from the following description.

Referring to FIG. 17, according to one embodiment of the present disclosure, if a motion for a mobile phone is repeatedly detected as one of $1^{st}$ level and $2^{nd}$ level while a motion for a wearable device is maintained as $2^{nd}$ level, a vehicle control mode can be entered. In this vehicle control mode, if an action of lifting up a hand is detected while a user wears the wearable device on his hand, the wearable device can check a saved vehicle location. If the motion for the mobile phone is not detected suddenly, the controller 180 of each of the devices can enter a handsfree mode. The reason for this is that, if the motion for the mobile phone is not detected suddenly, a user can be recognized as seated in the vehicle while carrying the mobile phone.

Of the motion for the mobile phone starts to be applied again, the controller 180 of each of the devices ends the handsfree mode and is then able to return to a previous reception mode. In doing so, the controller 180 of each of the devices can memorize a current location as a parking location of the vehicle. The reason for this is that, if the motion of the mobile phone is detected again in the vehicle control mode, it is able to assume that the mobile phone gets out of the parked vehicle.

According to one embodiment of the present disclosure, in office mode, the controller 180 of each of the devices can perform function suitable for an office situation. In the course of the office mode, if both of the motions for the wearable device and the mobile phone are detected as the $1^{st}$ level, the controller 180 of each of the devices memorizes a time for which a user does not move. If there is no motion over a prescribed duration, the controller 180 can request the user to perform such a motion as a stretching posture or the like. In doing so, the controller 180 outputs a short tip for the stretching and the like, thereby enabling an efficient exercise to be performed.

While the motion for the mobile phone is maintained as the $1^{st}$ level, if the motion for the wearable device occurs, the controller 180 of the mobile phone can output a sound or vibration alarm for the prevention of loss. The reason for this is that a user may go out by making a mistake of leaving the mobile phone behind while wearing the wearable device only.

If there is no motion on a determined schedule, the controller 180 of each of the devices can additionally output an alarm indicating the presence of the corresponding scheduled in association with a scheduler. For instance, in association with the scheduler, if a motion for the wearable device and/or a motion for the mobile phone is not detected despite that a schedule for a business trip is confirmed, it is able to assume that a user does not recognize the corresponding schedule. Therefore, the controller 180 of each of the devices provides an additional alarm for the unrecognized schedule to the user, thereby managing the schedules.

Accordingly, embodiments of the present disclosure provide various effects and/or features.

According to at least one of embodiments of the present disclosure, the present disclosure accurately analyzes a user's motion, thereby performing a prescribed function based on the analyzed motion.

According to at least one of embodiments of the present disclosure, the present disclosure performs a prescribed function through a user's motion, thereby enhancing accessibility to function activation.

According to at least one of embodiments of the present disclosure, the present disclosure links a prescribed function selected by a user to a repeatedly inputted motion pattern, thereby studying a motion pattern.

As embodied and broadly described herein, a mobile terminal according to the present invention may include a wireless communication unit, a sensing unit configured to detect a motion of the mobile terminal, and a controller establishing a session for a short range communication with a different mobile terminal, the controller measuring a strength (RSSI, received signal strength indicator) of a signal received from the different mobile terminal, the controller activating at least one sensor included in the sensing unit if the measured RSSI is equal to or greater than a prescribed numerical value.

In another aspect of the present invention, a method of controlling a mobile terminal, which establishes a short range communication with a different mobile terminal, according to the present invention may include the steps of measuring a strength (RSSI, received signal strength indicator) of a signal received from the different mobile terminal and activating at least one sensor included in a sensing unit if the measured RSSI is equal to or greater than a prescribed numerical value.

In a further aspect of the present invention, a wireless system, which includes a wireless communication group formed using a short range communication between mobile terminals, according to the present invention may include a 1st mobile terminal detecting a 1st motion pattern, the 1st mobile terminal, if the detected 1st motion pattern corresponds to a pre-saved pattern, transmitting the detected 1st motion pattern to a 2nd mobile terminal and the 2nd mobile terminal forming the wireless communication group with the 1st mobile terminal, the 2nd mobile terminal detecting a 2nd motion pattern, the 2nd mobile terminal, if determining that the detected 2nd motion pattern and the received 1st motion pattern match the pre-saved pattern, activating a prescribed function corresponding to the pre-saved pattern.

In another further aspect of the present invention, a method of controlling a wireless system, which includes a wireless communication group formed using a short range communication between mobile terminals, according to the present invention may include the steps of by a 1st mobile terminal belonging to the wireless communication group, detecting a 1st motion pattern, by the 1st mobile terminal, if determining that the detected 1st motion pattern corresponds to a pre-saved pattern, transmitting the detected 1st motion pattern to a 2nd mobile terminal, by the 2nd mobile terminal belonging to the wireless communication group, detecting a 2nd motion pattern, and if determining that the detected 2nd motion pattern and the received 1st motion pattern match the pre-saved pattern, activating a prescribed function corresponding to the pre-saved pattern.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a wireless communication interface;
a sensing unit comprising at least one of an acceleration sensor or a gyro sensor, an atmospheric pressure sensor, a proximity sensor or a humidity sensor, and configured to detect a pattern of motion of the mobile terminal, and wherein the pattern of motion comprises an inclination angle and a location of the mobile terminal; and
a controller configured to:
establish a short range communication session with a second mobile terminal,
measure a received signal strength indicator (RSSI) of a signal received from the second mobile terminal,
control the sensing unit based on the measured RSSI,
wherein the sensing unit comprising at least two sensors and when the measured RSSI is greater than or equal to a prescribed value, at least one sensor included in the sensing unit is activated,
wherein the controller is configured to receive, via the wireless communication interface, a pattern of motion of the second mobile terminal, wherein the pattern of motion of the second mobile terminal comprises an inclination angle and a location of the second mobile terminal,
wherein the controller is configured to calculate a relative pattern between the detected pattern of motion of the mobile terminal and the received pattern of motion of the second mobile terminal, and when the relative pattern correspond to a prescribed saved pattern, activate a function corresponding to the prescribed saved pattern, and
wherein the second mobile terminal is a wearable device and the mobile terminal is a handheld device.

2. The mobile terminal of claim 1, wherein the function corresponding to the prescribed saved pattern is releasing a locked state of the second mobile terminal to the second mobile terminal.

3. The mobile terminal of one of claim 1, wherein the detected pattern of motion of the mobile terminal includes motion of the mobile terminal after a prescribed amount of time at rest, the motion increasing to an amount greater than a prescribed amount of motion, and the mobile terminal being raised to a height greater than a first prescribed height, and
wherein the received pattern of motion of the second terminal includes a rotation of the second mobile terminal over a prescribed angle and the second mobile terminal being raised to a height greater than a second prescribed height.

4. The mobile terminal of claim 3, wherein, when the function of releasing the locked state of the second mobile terminal is activated and at least one event alarm is received from the second mobile terminal then the controller outputs the received at least one event alarm.

5. The mobile terminal of claim 1, further comprising a touchscreen, wherein the RSSI is periodically measured and, when an input is not received for a prescribed duration while the periodically measured RSSI is below the prescribed value, the touchscreen is deactivated.

6. The mobile terminal of claim 5, wherein a pattern of motion of the mobile terminal is detected by the sensing unit and a pattern of motion of the second mobile terminal is received at the wireless communication interface, and when the pattern of motion of the mobile terminal or the second mobile terminal is a rotation of the mobile terminal or the second mobile terminal greater than a prescribed angle, and an input is not received for a prescribed duration, the touchscreen is deactivated.

7. The mobile terminal of claim 1, further comprising a touchscreen,
wherein, when the pattern of motion of the mobile terminal includes a rotational motion over a prescribed angle and a relative inclination angle of the calculated relative pattern over the prescribed angle, an orientation of a display screen of the touchscreen is rotated, and
wherein, when the pattern of motion of the mobile terminal includes a rotational motion over a prescribed angle and a relative inclination angle of the calculated relative pattern doesn't over the prescribed angle, the orientation of the display screen of the touchscreen is not rotated.

8. The mobile terminal of claim 1, wherein in establishing the session for the short range communication with the second mobile terminal, when a pattern of motion corresponding to a prescribed saved pattern is detected, the controller further configured to broadcast, via the wireless communication interface, information regarding the detected pattern of motion and a signal for requesting authentication for the short range communication, and to receive a response from the second mobile terminal based on the information regarding the detected pattern of motion and the signal for requesting authentication for the short range communication.

9. The mobile terminal of claim 1, wherein the short range communication is based on a Bluetooth network, an NFC (near field communication) network or a Wi-Fi network.

10. The mobile terminal of claim 1, wherein in establishing the session for the short range communication with the second mobile terminal, when a pattern of motion corresponding to a prescribed saved pattern is detected, the controller further configured to
receive information regarding a prescribed pattern of motion of the second mobile terminal and a signal for requesting authentication for the short range communication from the second mobile terminal,
determine whether the detected pattern of motion and the received pattern of motion of the second remote terminal match each other, and
when the detected pattern of motion and the received pattern of motion of the second remote terminal match each other, transmit a response to the second mobile terminal in response to the received signal requesting authentication.

11. The mobile terminal of claim 10, wherein the received information regarding the prescribed pattern of motion of the second mobile terminal includes a motion information of the second mobile terminal detected at the second mobile terminal.

12. The mobile terminal of claim 1, wherein respective patterns of motion of the wearable device and the handheld device are obtained while the handheld device is held in a hand of the same arm on which the wearable device is worn.

13. A method of controlling a mobile terminal configured to establish short range communication with a second mobile terminal, the method comprising:
    establishing a short range communication session with a second mobile terminal;
    measuring a received signal strength indicator (RSSI) of a signal received from the second mobile terminal;
    controlling a sensing unit based on the measured RSSI, where the sensing unit is configured to detect a motion of the mobile terminal and a pattern of motion of the mobile terminal, where the sensing unit comprising at least two sensors, and comprising at least one of an acceleration sensor or a gyro sensor, an atmospheric pressure sensor, a proximity sensor or a humidity sensor;
    activating at least one sensor included in the sensing unit when the measured RSSI is greater than or equal to a prescribed value;
    receiving a pattern of motion of the second mobile terminal via the wireless communication interface;
    calculating a relative pattern between the detected pattern of motion of the mobile terminal and the received pattern of motion of the second mobile terminal; and
    activating a function corresponding to a prescribed saved pattern when the relative pattern corresponds to the prescribed saved pattern,
    wherein the second mobile terminal is a wearable device and the mobile terminal is a handheld device.

14. A wireless system that includes a wireless communication group formed using short range communication between mobile terminals, the wireless system comprising:
    a first mobile terminal and second mobile terminal configured to form a wireless communication group,
    wherein the first mobile terminal is configured to detect a first pattern of motion of the first mobile terminal, wherein when the detected first pattern of motion corresponds to a prescribed saved pattern, the first mobile terminal transmits information regarding the detected first pattern of motion to a second mobile terminal, wherein the respective pattern of motion is detected by a respective sensing unit comprising at least one of an acceleration sensor or a gyro sensor, an atmospheric pressure sensor, a proximity sensor or a humidity sensor, and
    wherein the second mobile terminal is configured to detect a second pattern of motion of the second mobile terminal, wherein the second mobile terminal is configured to calculate a relative pattern between the detected pattern of motion of the second mobile terminal and the received pattern of motion of the first mobile terminal, and determine whether the relative pattern matches the prescribed saved pattern, a prescribed function corresponding to the prescribed saved pattern is activated,
    wherein the second mobile terminal is a wearable device and the mobile terminal is a handheld device.

15. The wireless system of claim 14, wherein the second mobile terminal saves at least one pattern and at least one function by matching the at least one pattern and the at least one function to each other.

16. The wireless system of claim 15, wherein, in saving the at least one pattern and the at least one function by matching the at least one pattern and the at least one function to each other, the second mobile terminal detects a third pattern of motion,
    wherein the second mobile terminal determines whether the detected third pattern of motion is input repeatedly at least a prescribed number of times, and when the third pattern of motion is input repeatedly at least the prescribed number of times, a function is saved to correspond to the third pattern of motion.

17. A method of controlling a wireless system that includes a wireless communication group formed using short range communication between mobile terminals, the method comprising:
    detecting a first pattern of motion at a first mobile terminal that belongs to the wireless communication group;
    transmitting the detected first pattern of motion from the first mobile terminal to a second mobile terminal when the detected first pattern of motion corresponds to a prescribed saved pattern;
    detecting a second pattern of motion at the second mobile terminal that belongs to the wireless communication group;
    calculating a relative pattern between the detected pattern of motion of the mobile terminal and the received pattern of motion of the second mobile terminal; and
    when the relative pattern is determined to match the prescribed saved pattern, activating a prescribed function associated with the prescribed saved pattern,
    wherein the respective pattern of motion is detected by a respective sensing unit comprising at least one of an acceleration sensor or a gyro sensor, an atmospheric pressure sensor, a proximity sensor or a humidity sensor, and
    wherein the second mobile terminal is a wearable device and the mobile terminal is a handheld device.

* * * * *